United States Patent
Kubota et al.

(10) Patent No.: US 11,815,656 B2
(45) Date of Patent: Nov. 14, 2023

(54) ARTICLE INCLUDING FILM, OPTICAL APPARATUS, COATING MATERIAL, AND METHOD FOR PRODUCING ARTICLE

(71) Applicant: CANON KABUSHIKI KAISHA, Tokyo (JP)

(72) Inventors: Reiko Kubota, Yokohama (JP); Yoji Teramoto, Yokohama (JP); Shuhei Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 16/412,898

(22) Filed: May 15, 2019

(65) Prior Publication Data

US 2019/0353827 A1 Nov. 21, 2019

(30) Foreign Application Priority Data

| May 17, 2018 | (JP) | 2018-095572 |
| Aug. 2, 2018 | (JP) | 2018-145862 |
| Aug. 31, 2018 | (JP) | 2018-163774 |
| Oct. 11, 2018 | (JP) | 2018-192762 |
| Apr. 17, 2019 | (JP) | 2019-078891 |

(51) Int. Cl.
| G02B 1/04 | (2006.01) |
| B32B 27/30 | (2006.01) |
| B32B 27/36 | (2006.01) |
| G02B 5/20 | (2006.01) |
| G02B 5/26 | (2006.01) |

(52) U.S. Cl.
CPC .............. *G02B 1/04* (2013.01); *B32B 27/308* (2013.01); *B32B 27/365* (2013.01); *G02B 5/208* (2013.01); *G02B 5/26* (2013.01); *B32B 2255/28* (2013.01)

(58) Field of Classification Search
CPC . C09D 5/004; C09D 7/41; C09D 7/62; C09D 7/61; C08K 5/23; C08K 2003/2237; C08K 2003/2241; C08K 5/0041; C08K 9/02; G02B 5/208; G02B 1/04; G02B 5/26; B32B 27/308; B32B 27/365; B32B 2255/28

See application file for complete search history.

(56) References Cited

U.S. PATENT DOCUMENTS

| 5,962,143 A | 10/1999 | Helmuth |
| 2011/0170196 A1 | 7/2011 | Tanaka |

FOREIGN PATENT DOCUMENTS

| CN | 102575128 A | * 7/2012 | ........... C09D 175/04 |
| CN | 102762670 A | 10/2012 | |
| CN | 108710162 A | 10/2018 | |

(Continued)

OTHER PUBLICATIONS

Qiuyu Zhang, et al.; "Effect of Surface Treatment of Magnetic Particles On the Preparation of Magnetic Polymer Microspheres By Miniemulsion Polymerization"; Journal of Magnetism and Magnetic Materials, vol. 311, (2007), pp. 140-144.

(Continued)

*Primary Examiner* — Samir Shah
(74) *Attorney, Agent, or Firm* — Canon U.S.A., Inc., IP Division

(57) ABSTRACT

An article includes a film on a surface thereof, the film containing a resin, an organic azo-based particle, and a Ti- and O-containing particle so that the film is not separated or cracked and has a good design and good heat-shielding properties.

27 Claims, 13 Drawing Sheets

(56) References Cited

FOREIGN PATENT DOCUMENTS

| | | |
|---|---|---|
| EP | 2392457 A1 | 12/2011 |
| EP | 3388489 A1 | 10/2018 |
| GB | 2477930 A | 8/2011 |
| GB | 2477932 A | 8/2011 |
| JP | 2000-129172 A | 5/2000 |
| JP | 2009139856 A | 6/2009 |
| JP | 2011085235 A | 4/2011 |
| JP | 2014-185236 A | 10/2014 |
| KR | 10-1258363 B1 | 4/2013 |
| KR | 10-2017-0129436 A | 11/2017 |

OTHER PUBLICATIONS

BYK Additives & Instruments; "DYSPERBYK-180;" http://www.additives-downloads.de/output/ag_download.aspx?file=TDS_DISPERBYK-180_DE.pdf (2012).

Hashizume Kiyoshi "Organic Pigments (X) Organic Pigments for Paints (II)", 1968.

Encyclopedia Chemica 3, 1972, Editorial Committee of Encyclopedia Chemica.

\* cited by examiner

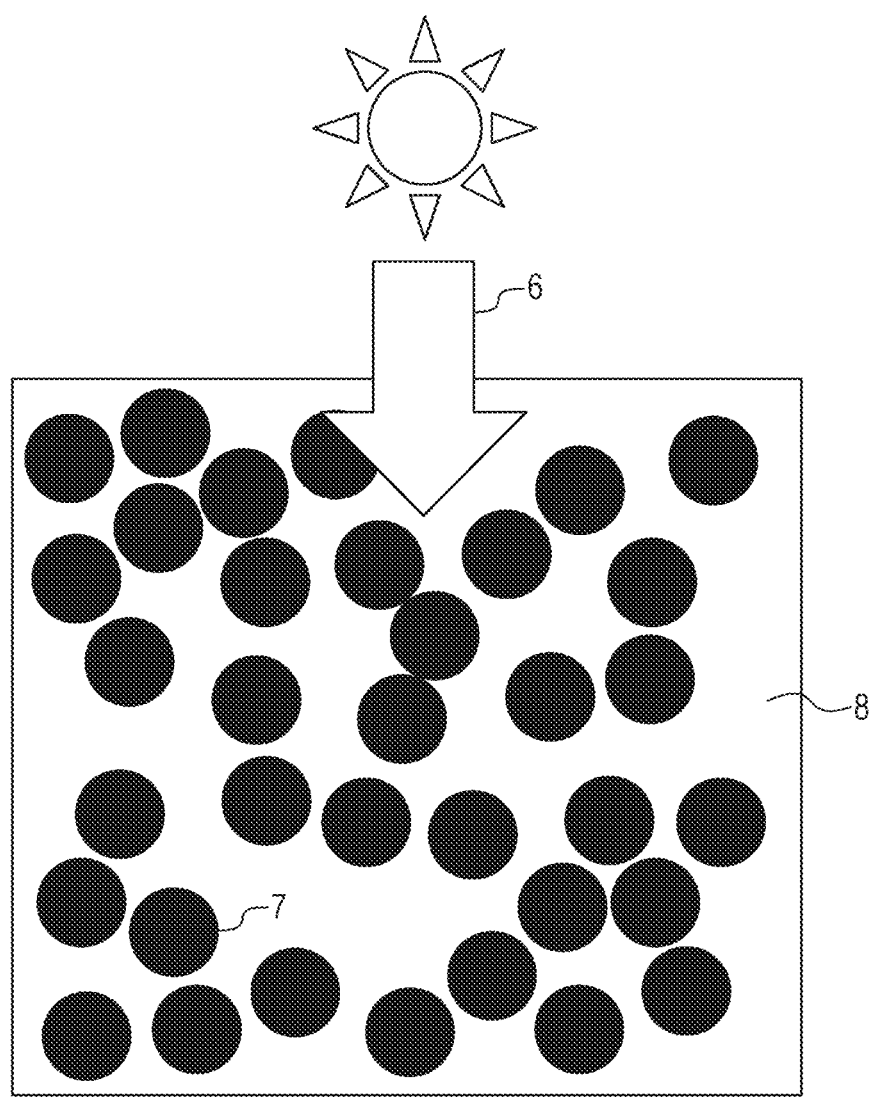

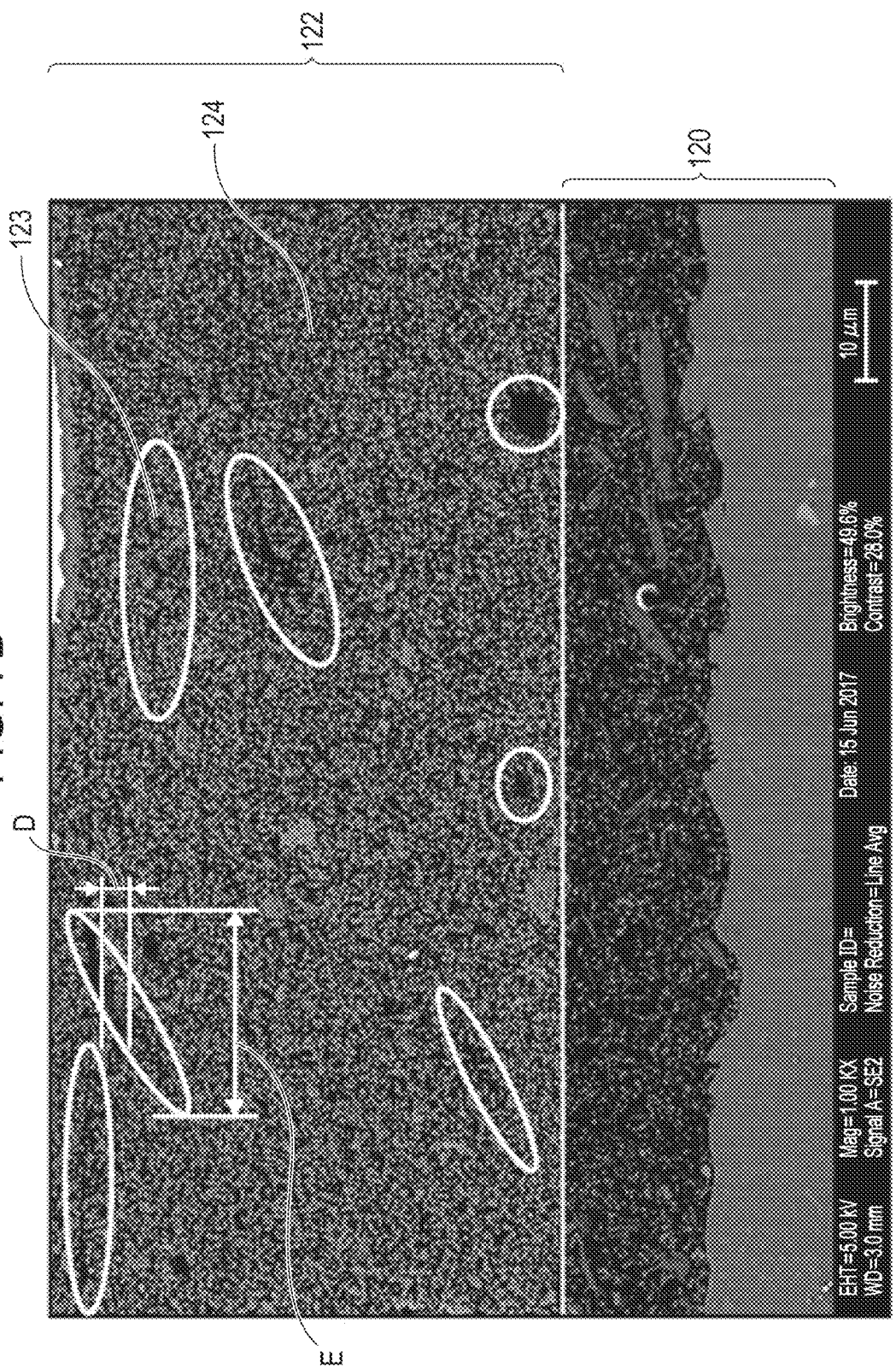

ARTICLE INCLUDING FILM, OPTICAL APPARATUS, COATING MATERIAL, AND METHOD FOR PRODUCING ARTICLE

BACKGROUND OF THE INVENTION

Field of the Invention

The present disclosure relates to an article including a film, an optical apparatus, a coating material, and a method for producing the article.

Description of the Related Art

The present disclosure relates to an article including a film, an optical apparatus, e.g., a lens barrel of an optical apparatus such as a camera, a camcorder, or a broadcasting apparatus and a camera main body, a camcorder may body, a surveillance camera, or a weather camera that may be used outdoors, and a coating material.

For example, a film having a function of suppressing the temperature rise of members due to solar light when used outdoors is disposed on a surface of an optical apparatus. In the related art, a method for reflecting incident light 1 of solar light as reflected light 2 using an infrared reflective film 4 on a substrate 5 as illustrated in FIG. 1 is known as a method for suppressing the temperature rise of members due to solar light. By increasing the ratio of the reflected light 2 to the incident light 1, the generation of heat caused by transmitted light 3 can be suppressed. A white titania having high reflectance in the visible to infrared region or a pigment having high infrared reflectance is often used as a material for increasing the reflectance. For the solar light energy distribution, visible light accounts for 47% and infrared light accounts for 50%. Therefore, high reflectance is required in a wide range from the visible region to the infrared region.

The above-mentioned infrared reflective film is an exterior film disposed on the surface of a lens barrel of an optical apparatus, and thus the external appearance of tinge viewed by users is also important. That is, a design that allows the appearance color of a lens barrel to have a desired tinge is also required. Since optical apparatuses are often used outdoors, light resistance under severe solar light conditions on the equator or the like is also required in addition to the heat-shielding properties.

Japanese Patent Laid-Open No. 2009-139856 (Patent Document 1) discloses that by disposing a colored layer on an infrared reflective layer, the temperature rise of a lens barrel due to infrared rays can be suppressed while the appearance color of the lens barrel is adjusted to a desired color. In Patent Document 1, the heat-shielding properties are also improved by disposing not only the infrared reflective layer and the colored layer, but also a heat-insulating layer having a thickness of 500 µm to 2000 µm. The colored layer in Patent Document 1 is formed by applying a coating material containing an infrared transmission coloring substance onto the surface of the infrared reflective layer, and thus the appearance color of the lens barrel can be adjusted to a desired color. As described above, Patent Document 1 discloses a multilayer film that is disposed on the surface of a lens barrel and that satisfies both the design and the heat-shielding properties.

Japanese Patent Laid-Open No. 2011-085235 (Patent Document 2) discloses a heat-shielding coating material for gas cylinders that provides a single-layer film having a relatively high brightness (L*) of 50 or more and 80 or less and a high solar reflectance of 40% or more. It is described that the heat-shielding coating material in Patent Document 2 provides good heat-shielding properties because the coating material exhibits a relatively high brightness of 50 or more and 80 or less and thus achieves a relatively high reflectance of visible light.

In Patent Document 1, however, a multilayer structure including a colored layer, an infrared reflective layer, and a heat-insulating layer is required to achieve both the design and the heat-shielding properties. In the multilayer film, infrared rays enter the film through undesired interfacial reflection on each layer, which deteriorates the temperature rise-reducing effect and causes separation and cracking of the film at interfaces of the layers in a hostile environment.

Patent Document 2 in which a single-layer film is provided describes that inorganic heat-shielding particles, organic heat-shielding particles, or both inorganic heat-shielding particles and organic heat-shielding particles can be used to relatively increase the brightness. However, the organic heat-shielding particles have a relatively low light resistance for solar light, which may cause fading.

SUMMARY OF THE INVENTION

An article according to an aspect of the present disclosure contains a resin, an organic azo-based particle, and a Ti- and O-containing particle.

An optical apparatus according to an aspect of the present disclosure is an optical apparatus including a film. The film contains a resin, an organic azo-based particle, and a Ti- and O-containing particle and is formed on an outer surface of the optical apparatus.

A coating material according to an aspect of the present disclosure contains a resin, an organic azo-based particle, and a Ti- and O-containing particle. When a content of the organic azo-based particle is assumed to be 100 wt %, a content of the Ti- and O-containing particle is 10 wt % or more and 1600 wt % or less.

A method for producing an article according to an aspect of the present disclosure includes forming a region that contains a resin and a particle having an average particle size of 100 nm or more and 400 nm or less and containing at least one of titania, alumina, zirconia, or zinc oxide; forming, on a part of a surface of the region, a region that does not contain the particle having an average particle size of 100 nm or more and 400 nm or less; and forming, on the region that does not contain the particle, a region that contains a resin and a particle having an average particle size of 100 nm or more and 400 nm or less and containing at least one of titania, alumina, zirconia, or zinc oxide.

A method for producing an article according to another aspect of the present disclosure includes applying a coating material containing a resin, an organic pigment, an inorganic pigment, and an alkylol ammonium salt onto a substrate and curing the applied coating material to form a film.

Further features of the present disclosure will become apparent from the following description of exemplary embodiments with reference to the attached drawings.

BRIEF DESCRIPTION OF THE DRAWINGS

FIGS. 2A to 2D are schematic sectional views for describing a film according to a first embodiment.

FIGS. 7A to 7D are schematic sectional views illustrating a film according to a second embodiment.

DESCRIPTION OF THE EMBODIMENTS

Hereafter, embodiments of the present disclosure will be described.

First Embodiment

First, an article including a film that is not easily subjected to discoloration (fading) due to solar light even if the film has a light color (high brightness) and that has good heat-shielding properties will be described. The discoloration in the present disclosure includes discoloration due to fading.
Method for Achieving Heat-Shielding Effect of Film Having High Brightness and Good Heat-Shielding Properties and Suppressing Discoloration Due to Solar Light
Relationship Between Discoloration of Organic Azo-Based Particles Due to Solar Light and Heat-Shielding Properties The Relationship between the discoloration of organic azo-based particles due to solar light and the heat-shielding properties will be described.

Organic azo-based particles are a colored pigment having a chemical structure of an azo group R—N=N—R' in a molecule. Such organic azo-based particles have higher infrared reflectivity than inorganic pigments. When the organic azo-based particles are irradiated with solar light, the azo group is sometimes cleaved into 2R and $N_2$. The organic azo-based particles exhibit a color by N=N contained therein and the surrounding atomic arrangement. Therefore, if N=N is cleaved, the color disappears, which increases the brightness. In this specification, the organic azo-based particles are defined as a colored pigment having a chemical structure of an azo group R—N=N—R' in a molecule. A colored pigment whose color has changed as a result of cleavage of N=N of a colored pigment having a chemical structure of an azo group R—N=N—R' in a molecule is also regarded as the organic azo-based particles.

Figure 2A:
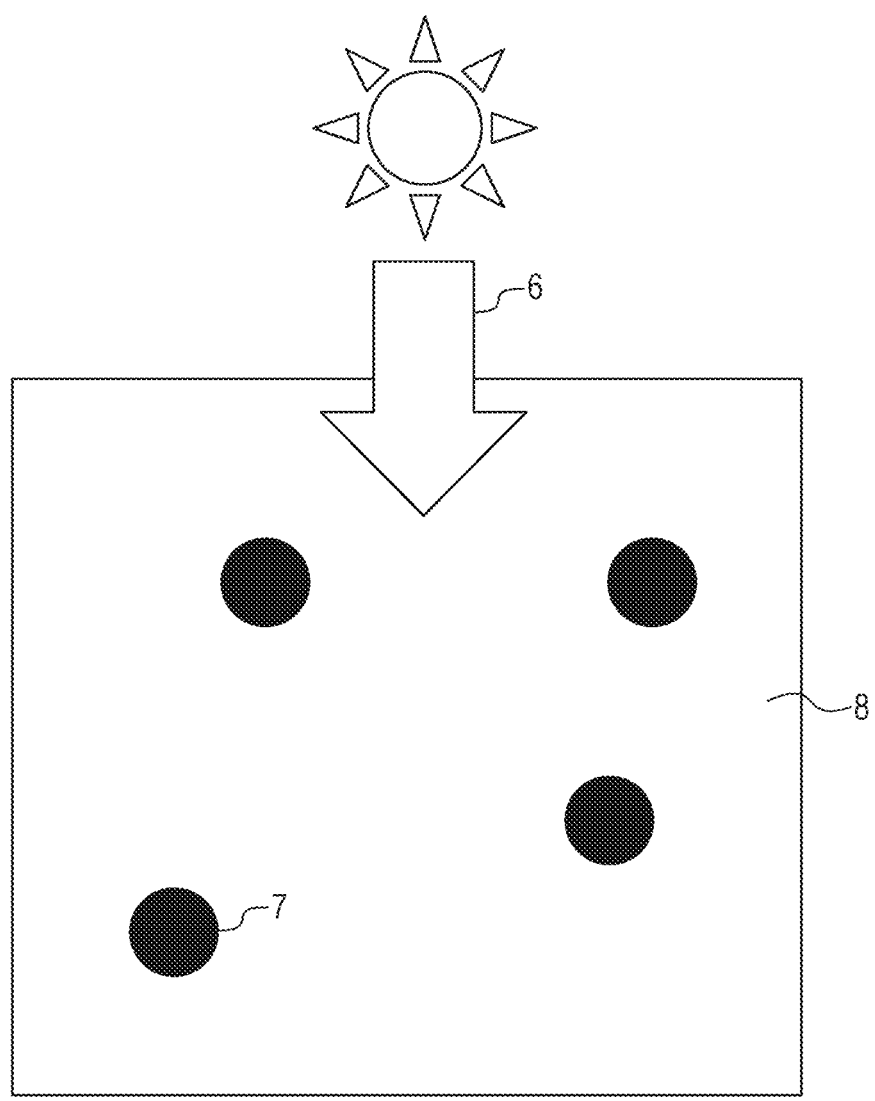
Figure 2B:
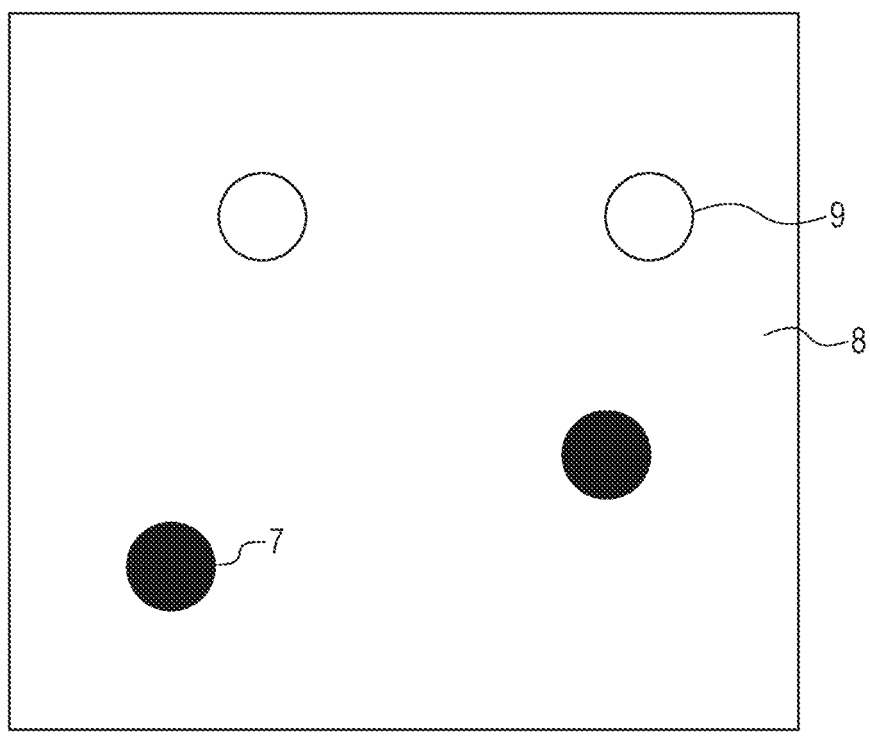

To increase the reflectance of visible light and improve the heat-shielding properties, the brightness on the surface of an optical apparatus needs to be set to 50 or more and organic azo-based particles having high reflectivity need to be used. If a film is formed on the surface of the optical apparatus, the film also needs to have high brightness. The organic azo-based particles having high reflectivity need to be used, but the amount of a coloring agent needs to be decreased to provide a film having high brightness. That is, as illustrated in FIG. 2A, the amount of organic azo-based particles 7 serving as a coloring agent is decreased to the degree that the organic azo-based particles 7 are sparsely present in a resin 8. The degree that the organic azo-based particles 7 are sparsely present means that, for example, the content of the organic azo-based particles is 0.1 vol % or more and 0.4 vol % or less relative to the volume of the film. When the azo group is cleaved by being irradiated with solar light 6, decolored organic azo-based particles 9 are obtained. As illustrated in FIG. 2B, since the organic azo-based particles 7 are sparsely present in the resin 8, the ratio of the organic azo-based particles 9 whose azo group has been cleaved to the organic azo-based particles 7 whose azo group is not cleaved is large. This considerably changes the color of a film formed on the surface of an optical apparatus.

Figure 2D:
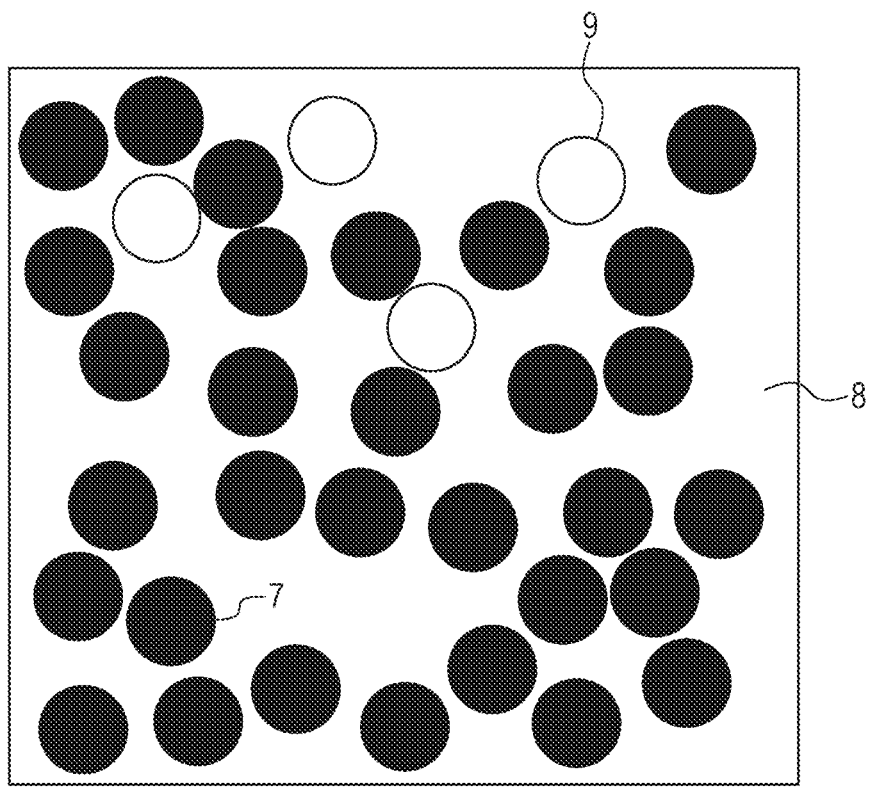

On the other hand, in a film having a relatively low brightness of less than 50, a large amount of organic azo-based particles 7 is present in the resin 8 as illustrated in FIG. 2C. Therefore, even if the azo group is cleaved by being irradiated with solar light 6, the ratio of the organic azo-based particles 9 whose azo group has been cleaved to the organic azo-based particles 7 whose azo group is not cleaved is small as illustrated in FIG. 2D. Therefore, the change in the color of the film formed on the surface of the optical apparatus is relatively small. However, the film having a brightness of less than 50 has high absorptivity of visible light and low reflectivity of solar light, which deteriorates the heat-shielding properties.
Method for Achieving Heat-Shielding Effect and Suppressing Discoloration According to Embodiment of the Present Disclosure As described above, the film having a brightness of 50 or more and including the organic azo-based particles 7 produces a large heat-shielding effect, but poses a disadvantage of discoloration due to solar light.

As a result of thorough studies on a method for achieving the heat-shielding effect and suppressing the discoloration, the present inventors have found that the discoloration due to solar light can be suppressed by further adding Ti- and O-containing particles to the film. Although the detail is described later, the Ti- and O-containing particles may contain at least one inorganic metal in addition to Ti and O.

Figure 3A:
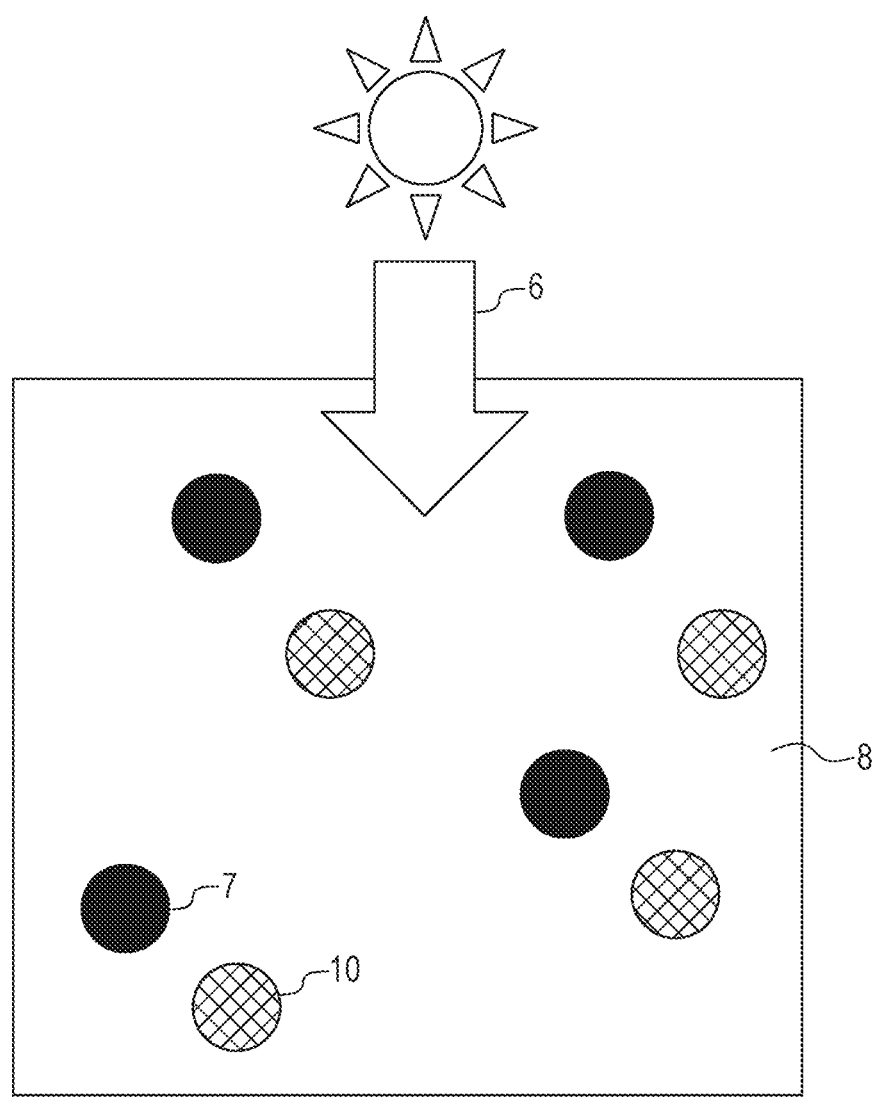
FIGS. 3A and 3B are schematic sectional views for describing the film according to the first embodiment.
Figure 3B:
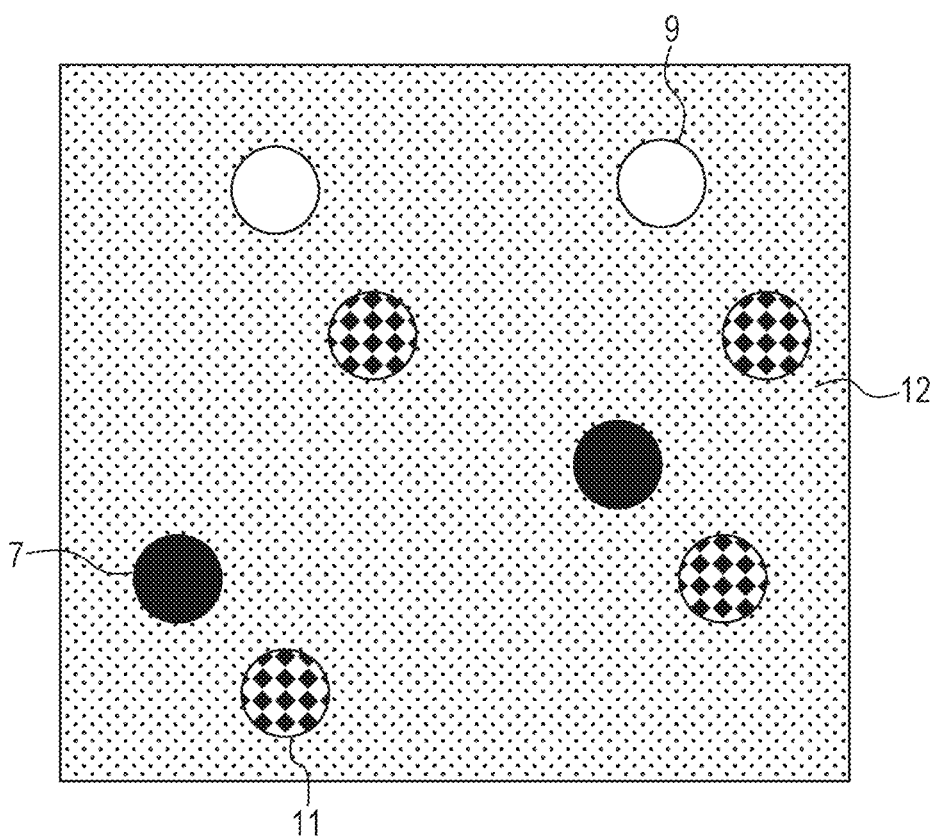

As illustrated in FIG. 3A, the film according to an embodiment of the present disclosure contains organic azo-based particles 7, a resin 8, and Ti- and O-containing particles 10. Furthermore, the brightness can be adjusted to 50 or more because the heat-shielding effect is improved. When the film according to an embodiment of the present disclosure is irradiated with solar light 6, as illustrated in FIG. 3B, the azo group of the organic azo-based particles 7 is cleaved and faded organic azo-based particles 9 are formed, which increases the brightness. At this time, $TiO_2$ in the Ti- and O-containing particles 10 is excited by photocatalysis due to solar light and excited Ti- and O-containing particles 11 are formed. The Ti- and O-containing particles 11 excited by solar light release electrons ($e^-$) into the resin 8, and the molecular chain of the resin 8 is cleaved by electron energy. As a result, the resin 8 becomes a discolored resin 12 and thus the brightness decreases.

Figure 4A:
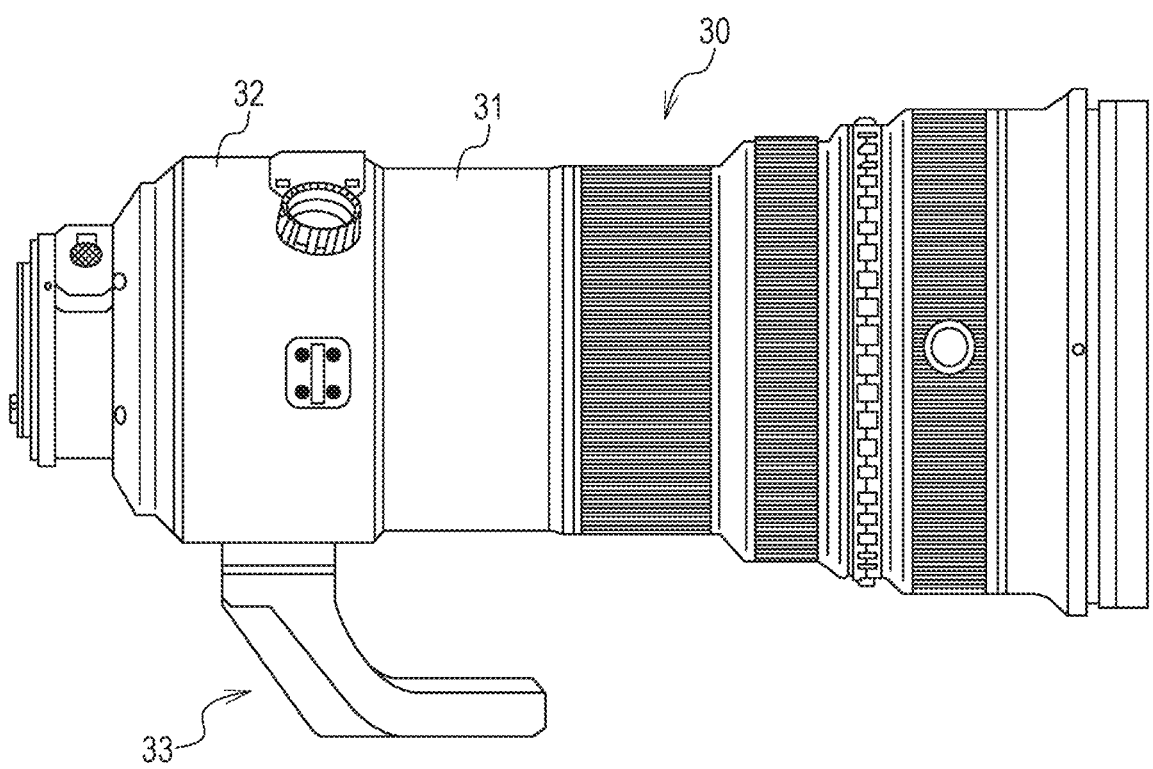
FIGS. 4A and 4B illustrate an example of an interchangeable lens for cameras including a lens barrel that is an optical apparatus according to one embodiment of the present disclosure.

In the film according to an embodiment of the present disclosure, the brightness of the organic azo-based particles 7 increases as a result of the irradiation with solar light 6 while the brightness of the Ti- and O-containing particles 10 decreases. On the whole, the discoloration is suppressed by the cancellation effect.
Article According to Embodiment of the Present Disclosure The article according to an embodiment of the present disclosure has a surface on which a film having good heat-shielding properties (a film according to an embodiment of the present disclosure) is formed by applying a coating material according to an embodiment of the present disclosure onto a plastic or metal substrate. That is, the article according to an embodiment of the present disclosure includes a film having good heat-shielding properties (a film according to an embodiment of the present disclosure) on the surface thereof. The article according to an embodiment of the present disclosure is particularly suitably used for optical apparatuses. The optical apparatus is, for example, an interchangeable lens used for cameras, camcorders, broadcasting apparatuses, and the like. The optical apparatus is also, for example, a camera main body, a camcorder main body, a surveillance camera, or a weather camera that is an image forming apparatus which may be used outdoors and in which an image is formed by light that passes through a lens. The optical apparatus according to an embodiment of the present disclosure produces a larger heat-shielding effect by forming the film according to an embodiment of the present disclosure in a portion (referred to as an outer surface) to be irradiated with solar light when used outdoors. FIG. 4A is an external view of an interchangeable lens for cameras that includes a lens barrel having a holding unit for holding lenses, the interchangeable lens being an optical apparatus according to one embodiment of the present disclosure. The interchangeable lens includes a lens barrel 30 and a tripod socket 33. The lens barrel 30 is constituted by, for example, a lens, a fixed barrel 31, and a ring-shaped member 32. In the optical apparatus according to an embodiment of the present disclosure, the film having good heat-shielding properties (the film according to an embodiment of the present disclosure) is formed on the surfaces of the fixed barrel 31 and the ring-shaped member 32 of the lens barrel 30 and on the surface of the tripod socket 33. The material for the fixed barrel 31, the ring-shaped member 32, and the tripod socket 33 is not particularly limited, and may be a plastic or a metal.

Figure 4B:
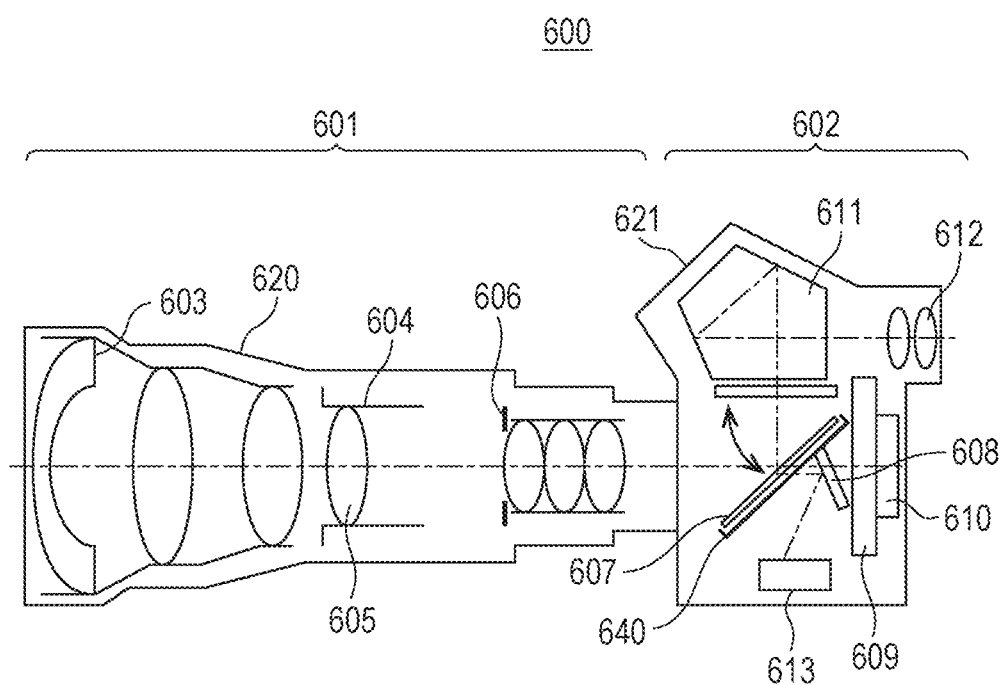

FIG. 4B is a sectional view illustrating a single-lens reflex digital camera to which an interchangeable lens including a lens barrel having a holding unit for holding lenses is joined, the single-lens reflex digital camera being an optical apparatus according to one embodiment of the present disclosure.

The optical apparatus according to an embodiment of the present disclosure is an apparatus in which the film according to an embodiment of the present disclosure is formed, e.g., a binocular, a microscope, a semiconductor exposure device, an interchangeable lens, or an electronic apparatus such as a camera. In particular, the optical apparatus is an apparatus equipped with an optical system including an optical element or an apparatus that generates an image using light that has passed through the optical element.

The optical apparatus according to an embodiment of the present disclosure may be a camera system such as a digital still camera or a digital camcorder or an electronic apparatus including an image pickup element that receives light that has passed through an optical element according to an embodiment of the present disclosure, such as a mobile phone. A module, such as a camera module, mounted on the electronic apparatus may be used as an image pickup device.

In FIG. 4B, a camera main body 602 and an interchangeable lens 601 serving as an optical apparatus 600 and including an outer barrel 620 of a lens barrel on which the film according to an embodiment of the present disclosure is formed are joined to each other. The interchangeable lens 601 is detachably mounted on the camera main body 602.

Light from an object passes through an optical system constituted by a plurality of lenses 603 and 605 arranged on the optical axis of an imaging optical system in the interchangeable lens 601 and is received by an image pickup element.

Herein, the lens 605 is supported by an inner barrel 604 of the lens barrel and is movably supported by the outer barrel 620 of the lens barrel for focusing and zooming.

For the duration of observation before capturing, light from an object is reflected by a main mirror 607 in a casing 621 of the camera main body and passes through a prism 611. Then, a photographer sees the capturing image through a viewfinder lens 612. The main mirror 607 is, for example, a half mirror. The light that has passed through the main mirror is reflected by a sub-mirror 608 toward an autofocusing (AF) unit 613, and this reflected light is used for, for example, focusing. The main mirror 607 is mounted on and supported by a main mirror holder 640 through adhesion. During capturing, the main mirror 607 and the sub-mirror 608 are moved to positions outside the optical path using a driving mechanism (not illustrated), a shutter 609 is opened, and the captured image incident from the lens barrel 601 is focused on the image pickup element 610. A diaphragm 606 is provided so that the brightness and focal depth during capturing can be changed by adjusting the aperture area.

Coating Material According to Embodiment of the Present Disclosure

First, a coating material and a method for producing the coating material according to embodiments of the present disclosure will be described.

The coating material according to an embodiment of the present disclosure contains at least a resin, organic azo-based particles, and Ti- and O-containing particles.

Organic Azo-Based Particles

The organic azo-based particles contained in the coating material according to an embodiment of the present disclosure will be described.

The organic azo-based particles contained in the coating material according to an embodiment of the present disclosure may be any particles as long as the organic azo-based particles are particles of a compound having an azo group. Examples of the color of the organic azo-based particles contained in the coating material according to an embodiment of the present disclosure include black-based colors, yellow-based colors, red-based colors, and orange-based colors. A black-based color can be employed because the change in tinge ($a*$ and $b*$) is small when fading is caused by solar light. The solar reflectance can be set to be high, and a material having a solar reflectance of more than 10% achieved by only organic azo-based particles can be selected. Examples of the organic azo-based particles include particles of nickel azo pigments, insoluble azo pigments, soluble azo pigments, high-molecular-weight azo pigments, and azomethine azo pigments. These organic azo-based particles may be used alone or in combination of two or more.

The average particle size of the organic azo-based particles contained in the coating material according to an embodiment of the present disclosure is preferably 10 nm or more and 5 µm or less and more preferably 50 nm or more and 2 µm or less. If the average particle size of the organic azo-based particles contained in the coating material according to an embodiment of the present disclosure is less than 10 nm, the surface area of the particles increases. Consequently, the light resistance deteriorates, which may cause discoloration. If the average particle size of the organic azo-based particles contained in the coating material according to an embodiment of the present disclosure is more than 5 µm, the degree of irregularities of a coating film increases and the thickness precision deteriorates, which may deteriorate the precision of focusing and the like.

The azo-based particles may each have any shape. Examples of the shape include a globular shape, a plate shape, a cubic shape, an elliptical shape, a layered shape, a hollow shape, a star shape, a needle shape, and an odd shape. These organic azo-based particles may be used alone or in combination of two or more.

The content of the organic azo-based particles in the coating material according to an embodiment of the present disclosure is preferably 0.1 wt % or more and 1.0 wt % or less and more preferably 0.15 wt % or more and 0.5 wt % or less relative to the nonvolatile components in the coating material. If the content of the organic azo-based particles is less than 0.1 wt %, the brightness of the film excessively increases, which may deteriorate the antifouling properties. If the content of the organic azo-based particles is 1.0 wt % or more, the brightness of the film excessively decreases, which deteriorates the solar reflectance. The content of the azo-based particles relative to the nonvolatile components in the coating material can be determined by the same method as the content of organic azo-based particles contained in the film according to an embodiment of the present disclosure after the coating material is cured. The method will be described later.

Ti- and O-Containing Particles

Next, the Ti- and O-containing particles contained in the coating material according to an embodiment of the present disclosure will be described. As described above, the Ti- and O-containing particles contained in the coating material according to an embodiment of the present disclosure may contain at least one inorganic metal in addition to Ti and O. When at least one inorganic metal s contained in addition to Ti and O, the color of particles changes and thus such an inorganic metal can be used as particles (pigment) for changing the color. An example of the Ti- and O-containing particles according to an embodiment of the present disclosure is titania. Specific examples of the Ti- and O-containing particles include (Ti,Ni,Sb)Ox, (Ti,Cr,Sb)Ox, (Ti,Fe,Zn)Ox, (Co,Cr,Zn,Al,Ti)Ox, (Co,Cr,Zn,Ti)Ox, and (Co,Al,Ni,Ti)Ox. For example, (Ti,Ni,Sb)Ox is a pigment having a crystal structure obtained by firing titanium oxide, nickel oxide, and antimony oxide. The Ti- and O-containing particles according to an embodiment of the present disclosure are particles of one material selected from titania, $(Ti,Sb,Cr)O_2$, and $(Ti,Fe,Zn)O_2$ or particles of a mixture of materials selected from the foregoing.

These Ti- and O-containing particles are hardly coated with or are not coated with silica or the like having light resistance because the molecular chain of a resin needs to be cleaved by photocatalysis. The content of the Ti- and O-containing particles relative to the nonvolatile components in the coating material can be determined by the same method as the content of the Ti- and O-containing particles in the film according to an embodiment of the present disclosure after the coating material is cured. The method will be described later.

The content of the Ti- and O-containing particles in the coating material according to an embodiment of the present disclosure is preferably 0.1 wt % or more and 1.6 wt % or less and more preferably 0.3 wt % or more and 0.7 wt % or less relative to the nonvolatile components in the coating material. If the content of the Ti- and O-containing particles in the coating material according to an embodiment of the present disclosure is less than 0.1%, the photocatalysis during irradiation with solar light is low, which may considerably change the brightness of the film according to an embodiment of the present disclosure. If the content of the Ti- and O-containing particles in the coating material according to an embodiment of the present disclosure is more than 1.6 wt %, the photocatalysis during irradiation with solar light is excessively high, which may considerably change the brightness of the film according to an embodiment of the present disclosure.

The average particle size of the Ti- and O-containing particles contained in the coating material according to an embodiment of the present disclosure is preferably 10 nm or more and 5 µm or less and more preferably 50 nm or more and 2 µm or less. If the average particle size of the Ti- and O-containing particles according to an embodiment of the present disclosure is less than 10 nm, the surface area of the particles increases. Consequently, the photocatalysis increases, which may cause discoloration. If the average particle size of the Ti- and O-containing particles according to an embodiment of the present disclosure is more than 5 µm, the degree of the irregularities of a coating film increases and the thickness precision deteriorates, which may deteriorate the precision of focusing and the like.

When the content of the organic azo-based particles in the coating material is assumed to be 100 wt %, the content of the Ti- and O-containing particles can be set to 10 wt % or more and 1600 wt % or less. Outside this range, the brightness may considerably change.

Resin

Next, the resin contained in the coating material according to an embodiment of the present disclosure will be described.

Examples of the resin contained in the coating material according to an embodiment of the present disclosure include epoxy resin, urethane resin, acrylic resin, urethane-acrylic resin, phenolic resin, and alkyd resin. These resins may be used alone or in combination of two or more.

The content of the resin in the coating material according to an embodiment of the present disclosure is preferably 5 wt % or more and 80 wt % or less and more preferably 15 wt % or more and 50 wt % or less relative to the nonvolatile components in the coating material. If the content of the resin according to an embodiment of the present disclosure is less than 5 wt %, the adhesion to a substrate may deteriorate. If the content of the resin according to an embodiment of the present disclosure is more than 50 wt %, the solar reflectance may deteriorate. The content of the resin relative to the nonvolatile components in the coating material can be determined by the same method as the content of a resin in the film according to an embodiment of the present disclosure after the coating material is cured. The method will be described later.

Particle for Adjusting Brightness (Inorganic Pigment)

The coating material according to an embodiment of the present disclosure may contain, as particles for adjusting the brightness, particles of an inorganic pigment other than the Ti- and O-containing particles. The brightness of the film according to an embodiment of the present disclosure is preferably 50 or more and more preferably 71 or more and 80 or less. In this specification, the inorganic pigment other than the Ti- and O-containing particles is simply referred to as an inorganic pigment.

The particles (inorganic pigment) contained in the coating material according to an embodiment of the present disclosure and used for adjusting the brightness to 50 or more may be any particles as long as the brightness can be adjusted. The particles (inorganic pigment) according to an embodiment of the present disclosure for adjusting the brightness to 50 or more preferably have a high solar reflectance and more preferably have a solar reflectance of more than 10% achieved by the material by itself. Examples of the particles (inorganic pigment) according to an embodiment of the present disclosure for adjusting the brightness to 50 or more include titanic (titanium oxide) whose surface is coated with silica, alumina, zirconia, silica, hollow silica, and zinc oxide. These materials may be used alone or in combination. If the brightness of the film formed using the coating material according to an embodiment of the present disclosure is less than 50, the solar reflectance decreases, which reduces the temperature-decreasing effect. If the brightness of the film formed using the coating material according to an embodiment of the present disclosure is more than 80, the film is excessively whitened, which may cause dirt to be noticeable. In this specification, titania whose surface is coated with silica means that at least part of surfaces of titania particles is coated with silica. The particles (inorganic pigment) for adjusting the brightness to 50 or more may be titanium oxide particles whose surfaces are coated with silica.

Rutile titanium oxide and anatase titanium oxide can be used as titanium oxide of the titanium oxide particles whose surfaces are coated with silica. Furthermore, at least part of titanium oxide is coated with silica. If titanium oxide is not coated with silica, the titanium oxide is considerably discolored in an oxygen-free atmosphere, which decreases the reflectance. The titanium oxide may be coated with a plurality of materials such as zirconium oxide, aluminum oxide, and an organic compound in addition to silica. The titanium oxide particles coated with silica have an average particle size of 0.2 µm or more. If the average particle size of the titanium oxide particles coated with silica is less than 0.2 µm, the charge of the particles decreases. This makes it difficult to attract silica particles described later, which may considerably cause discoloration in an oxygen-free atmosphere. If the average particle size of the titanium oxide particles coated with silica is more than 5 µm, the degree of irregularities of a coating film increases and the thickness precision deteriorates, which may deteriorate the precision of focusing and the like. Therefore, the average particle size of the titanium oxide particles coated with silica can be set to 5 µm or less.

The content of the particles (titanium oxide particles whose surfaces are coated with silica) contained in the coating material according to an embodiment of the present disclosure and used for adjusting the brightness to 50 or more is preferably 5 wt % or more and 80 wt % or less and more preferably 10 wt % or more and 40 wt % or less relative to the nonvolatile components in the coating material. If the content of the particles (titanium oxide particles whose surfaces are coated with silica) according to an embodiment of the present disclosure for adjusting the brightness to 50 or more is less than 5 wt %, the tinting strength is low, which may make it difficult to adjust the brightness to 50 or more. If the content of the particles (titanium oxide particles whose surfaces are coated with silica) for adjusting the brightness to 50 or more is more than 80 wt %, the film may become brittle. The content of the particles for adjusting the brightness to 50 or more relative to the nonvolatile components in the coating material can be determined by the same method as the content of the particles contained in the film according to an embodiment of the present disclosure and used for adjusting the brightness to 50 or more after the coating material is cured. The method will be described later.

In this specification, the titanium oxide particles whose surfaces are coated with silica may be any titania particles as long as at least part of the surfaces of the titanium oxide particles is coated with silica. Eighty percent or more of the surfaces of the titanium oxide particles can be coated with silica relative to the entire surface area of the titanium oxide particles. In this specification, the titania particles whose surfaces are coated with silica are one example of the inorganic pigment and also one example of the particles for adjusting the brightness to 50 or more.

Silica Particle

In this embodiment, silica particles may be further contained. The average particle size of the silica particles can be set to 10 nm or more and 110 nm or less. When the average particle size is in the range of 10 nm or more and 110 nm or less, minute defects of silica that coats the surfaces of the titania particles can be filled, which suppresses the discoloration in an oxygen-free atmosphere. If the average particle size of the silica particles according to this embodiment is less than 10 nm, the minute defects of silica that coats the surfaces of the titanium oxide particles are not easily filled, which may make it difficult to suppress the discoloration in an oxygen-free atmosphere. If the average particle size of the silica particles contained in the coating material according to an embodiment of the present disclosure is more than 110 nm, the absorbability to titanium oxide deteriorates, which may make it difficult to suppress the discoloration in an oxygen-free atmosphere.

The silica particles may have any shape. Example of the shape of the silica particles include a globular shape, an indefinite shape, a star shape, a chain shape, a hollow shape, and a porous shape. These silica particles may be used alone or in combination of two or more.

Figure 7A:
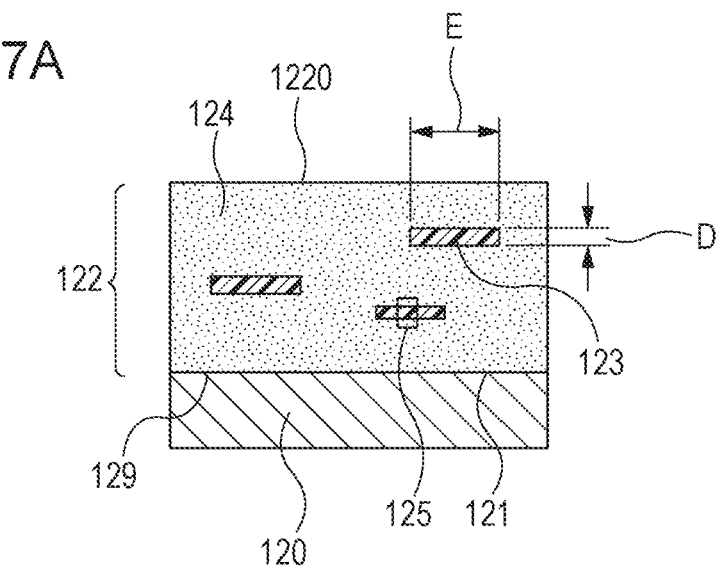
Figure 7B:
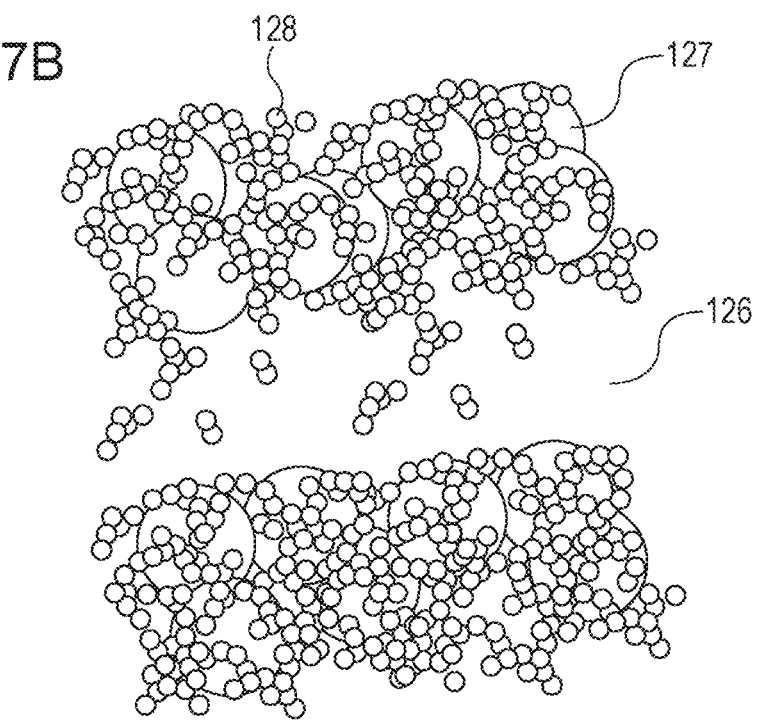
Figure 7C:

The particle size of silica particles 128 according to this embodiment is a number-average particle size. Before the coating material is applied, the average particle size of the silica particles 128 can be measured by a dynamic light scattering method. When the average particle size is measured after formation of a film, samples having a thickness of 300 nm and a size of 5 µm×5 µm are cut out from the film according to this embodiment at five positions and magnified by 100,000 times by transmission electron microscopy (TEM). Then, the silica particles 128 are subjected to area analysis at the five positions by energy dispersive X-ray spectroscopy (EDS) to determine the particle sizes of the silica particles 128 and calculate the average of the particle sizes. Finally, the average of the particle sizes at the five positions is determined. The average of the particle sizes at the five positions is defined as an average particle size of the silica particles contained in the film according to this embodiment. In this embodiment, for example, when silica particles 128 having a particle size of 10 nm or more and 50 nm or less are aggregated to form secondary particles as illustrated in FIG. 7C, the application property can be improved when the length of the secondary particles in a long-side direction is 50 nm or more and 350 nm or less. In particular, branched silica particles constituted by chains of silica particles 128 having a globular shape can be selected. When the coating material for forming a light-shielding film is applied, the branched silica particles constituted by chains of silica particles 128 having a globular shape are suitable because the space formed by the silica particles 128 increases and thus particles 127 can readily move.

The content of the silica particles is 0.6 mass % or more and 14 mass % or less and is preferably 1 mass % or more and 10 mass % or less relative to the nonvolatile components in the coating material. If the content of the silica particles is less than 0.6 mass %, minute defects of silica that coats the titanium oxide particles cannot be completely filled, which may further cause discoloration in an oxygen-free atmosphere. If the content of the silica particles according to an embodiment of the present disclosure is more than 14 mass %, the haze of a coating film deteriorates, which may deteriorate the reflectance. The content of the silica particles relative to the nonvolatile components in the coating material can be determined by the same method as the content of the silica particles in the film according to an embodiment of the present disclosure described later after the coating material is cured. The method will be described later.

Dispersant

A dispersant contained in the coating material according to this embodiment may be any dispersant as long as the dispersant can aggregate organic pigments rather than inorganic pigments. In particular, the dispersant contains an alkylol ammonium salt. Originally, a dispersant adsorbs onto the surfaces of pigment particles to keep a constant distance between the pigment particles away from each other, thereby preventing the aggregation between the pigment particles. However, the dispersant in this embodiment aggregates organic pigments and disperses inorganic pigments.

The dispersant according to an embodiment of the present disclosure may include at least an acid radical. The dispersant according to an embodiment of the present disclosure may have an acid value (mgKOH/g) of 30 or more and 100 or less. At an acid value (mgKOH/g) of 30 or more and 100 or less, the organic pigment can be more appropriately precipitated on the air interface side. The amount of the dispersant added may be larger than that of the organic pigment. If the amount of the dispersant added is smaller than that of the organic pigment, the organic pigment is partly dispersed, which decreases the amount of the organic pigment segregated on the air interface side.

The content of the dispersant in the coating material according to an embodiment of the present disclosure is preferably 0.1 wt % or more and 10.0 wt % or less and more preferably 0.15 wt % or more and 7.0 wt % or less relative to the nonvolatile components in the coating material. If the content of the dispersant is less than 0.1 wt %, the heat-shielding properties deteriorate. If the content of the dispersant is 10.0 wt % or more, the refractive index of layers decreases, which reduces the reflection due to the difference in refractive index.

Solvent

A solvent contained in the coating material will be described.

Any solvent may be used. Examples of the solvent include water, thinner, ethanol, isopropyl alcohol, and n-butyl alcohol. Other examples of the solvent include ethyl acetate, propyl acetate, isobutyl acetate, butyl acetate, methyl ethyl ketone, methyl isobutyl ketone, propylene glycol monomethyl ether, toluene, xylene, acetone, cellosolves, glycol ethers, and ethers. These solvents may be used alone or in combination of two or more.

The viscosity of the coating material according to an embodiment of the present disclosure is preferably 10 mPa·s or more and 10000 mPa·s or less and more preferably 50 mPa·s or more and 500 mPa·s or less. If the viscosity of the coating material is less than 10 mPa·s, the thickness of a coated heat-shielding film may decrease in some places. If the viscosity of the coating material is more than 10000 mPa·s, the application property of the coating material may deteriorate.

Other Additives

The coating material according to an embodiment of the present disclosure may contain any other additives. Examples of the additives include dispersants, curing agents, curing catalysts, plasticizers, thixotropy-imparting agents, leveling agents, matting agents, preservatives, ultraviolet absorbers, antioxidants, coupling agents, and inorganic fine particles and organic fine particles for adjusting the tinge other than the above fine particles.

Method for Producing Coating Material

Hereafter, a method for producing a coating material according to an embodiment of the present disclosure will be described.

The method for producing a coating material according to an embodiment of the present disclosure may be any method as long as the organic azo-based particles, the Ti- and O-containing particles, and the particles for adjusting the brightness to 50 or more can be dispersed in the coating material. For example, a method that uses a bead mill, a ball mill, a jet mill, a three-roll mixer, a planetary mixer, a mixer, an ultrasonic disperser, or a homogenizer can be employed.

Article According to Embodiment of the Present Disclosure

Next, an article according to an embodiment of the present disclosure will be described.

A film (the film according to an embodiment of the present disclosure) having good heat-shielding properties is formed on a surface of the article according to an embodiment of the present disclosure by applying the coating material according to an embodiment of the present disclosure onto a plastic or metal substrate. That is, this embodiment can provide an article such as an optical apparatus including, on its surface, a film that is not separated or cracked and has both good design and good heat-shielding properties. Therefore, the article according to an embodiment of the present disclosure includes, on its surface, a film (the film according to an embodiment of the present disclosure) having good heat-shielding properties. The film can be formed on the outer side (the side exposed to an outer environment) relative to the substrate. The film according to an embodiment of the present disclosure may closely adhere to the substrate or a primer layer for improving the adhesiveness may be disposed between the substrate and the film according to an embodiment of the present disclosure.

Substrate

The substrate may be formed of any material such as a metal or a plastic. Examples of the metal include aluminum, titanium, stainless steels, magnesium alloys, and lithium-magnesium alloys. Examples of the plastic include polycarbonate resin, acrylic resin, ABS resin, and fluororesin.

The substrate may have any thickness. The thickness is preferably 0.5 mm or more and 5 mm or less and more preferably 0.5 mm or more and 2 mm or less. If the thickness is less than 0.5 mm, it is difficult to maintain the shape of a lens barrel. If the thickness is more than 5 mm, the cost of members increases.

Primer

A primer may be used to improve the adhesiveness between the substrate and the film.

The primer may be formed of any material. Examples of the material include epoxy resin, urethane resin, acrylic resin, silicone resin, and fluororesin. The primer may contain the particles according to an embodiment of the present disclosure, particles other than the particles according to an embodiment of the present disclosure, a coloring agent, a dispersant, a curing agent, a curing catalyst, a plasticizer, a thixotropy-imparting agent, a leveling agent, an organic coloring agent, an inorganic coloring agent, a preservative, an ultraviolet absorber, an antioxidant, a coupling agent, and a solvent residue.

The thickness of the primer is preferably 2 µm or more and 30 µm or less and more preferably 5 µm or more and 20 µm or less. If the thickness is less than 2 µm, the adhesiveness of the film sometimes decreases. If the thickness is more than 30 µm, the positioning accuracy may be adversely affected.

Thickness of Film According to Embodiment of the Present Disclosure

The thickness of the film according to an embodiment of the present disclosure can be set to 10 µm or more and 70 µm or less. If the thickness is less than 10 µm, the solar reflectance may deteriorate. If the thickness is more than 70 µm, the positioning accuracy of the optical apparatus may be adversely affected.

Method for Producing Article

In the method for producing an article according to an embodiment of the present disclosure, any coating method and any curing method may be employed as long as the coating material according to an embodiment of the present disclosure can be uniformly applied onto a substrate so as to have a thickness of 10 µm or more and 70 µm or less.

Examples of the coating method include coating with a brush, spray coating, dip coating, and transfer. The heat-shielding film may be constituted by a single coating layer or a plurality of coating layers, or may be grained to achieve good design.

The curing method may be a method in which the coating material is left to stand at room temperature, a method in which curing is facilitated by any heating process, or a method in which ultraviolet rays are applied. In the method for performing curing through a heating process, for example, a heating furnace, a heater, or infrared heating may be employed. The curing temperature is preferably room temperature to 400° C. and more preferably room temperature to 200° C.

As described above, a film (the film according to an embodiment of the present disclosure) having good heat-shielding properties is formed on the surface of the article according to an embodiment of the present disclosure by applying the coating material according to an embodiment of the present disclosure onto a plastic or metal substrate. The thus-formed film contains at least a resin, organic azo-based particles, and Ti- and O-containing particles.

Organic Azo-Based Particle

The content of the organic azo-based particles in the film according to an embodiment of the present disclosure is preferably 0.1 area % or more and 0.4 area % or less and more preferably 0.15 area % or more and 0.3 area % or less. If the content of the organic azo-based particles is less than 0.1 area %, the brightness of the film excessively increases, which may deteriorate the antifouling properties. If the content of the organic azo-based particles is 0.4 area % or more, the brightness of the film excessively decreases, which deteriorates the solar reflectance.

The content of the organic azo-based particles in the film according to an embodiment of the present disclosure is measured by the following method. First, cross-sections (3 µm×3 µm) near the surface of the film according to an embodiment of the present disclosure are cut out at five positions and magnified by 100,000 times by transmission electron microscopy (TEM). When the particle size is large, cross-sections (10 µm×10 µm) are cut out at five positions and magnified by 30,000 times by transmission electron microscopy (TEM). Then, the organic azo-based particles are subjected to area analysis at the five positions by energy dispersive X-ray spectroscopy (EDS) to calculate the content per unit area. Finally, the content of the organic azo-based particles in the film according to an embodiment of the present disclosure is calculated from the average of the contents at the five positions. Since the average of cross-sectional areas at five positions is employed in this analysis method, the theoretical volume is substantially equal to the analytical value in this method.

Ti- and O-Containing Particle

The content of the Ti- and O-containing particles in the film according to an embodiment of the present disclosure is preferably 0.1 area % or more and 1.0 area % or less and more preferably 0.2 area % or more and 0.7 area % or less relative to the cross-sectional area of the film. If the content of the Ti- and O-containing particles according to an embodiment of the present disclosure is less than 0.1 area %, the photocatalysis during irradiation with solar light is low, which may considerably change the brightness of the film according to an embodiment of the present disclosure. If the content of the Ti- and O-containing particles according to an embodiment of the present disclosure is more than 1.0 area % the photocatalysis during irradiation with solar light is excessively high, which may considerably change the brightness of the film according to an embodiment of the present disclosure.

The content of the Ti- and O-containing particles in the film according to an embodiment of the present disclosure is measured by the following method. First, cross-sections (3 µm×3 µm) near the surface of the film according to an embodiment of the present disclosure are cut out at five positions and magnified by 100,000 times by transmission electron microscopy (TEM). When the particle size is large, cross-sections (10 µm×10 µm) are cut out at five positions and magnified by 30,000 times by transmission electron microscopy (TEM). Then, the particles are subjected to area analysis at the five positions by energy dispersive X-ray spectroscopy (EDS) to calculate the content per unit area. Finally, the content of the Ti- and O-containing particles in the film according to an embodiment of the present disclosure is calculated from the average of the contents at the five positions, and this value is defined as a content of the Ti- and O-containing particles. In this embodiment, the content calculated by this method is expressed in units of area %.

The Ti- and O-containing particles are particles in which the contact area between the Ti- and O-containing particles and the resin is 20% or more relative to the surface area of the Ti- and O-containing particles. Specifically, the cross-sections cut out to calculate the content are subjected to area analysis in the same manner. When the ratio of the profile line length of a particular particle in contact with the resin to the entire profile line length of the cross-section of the particular particle is 20% or more, the particular particle is referred to as a Ti- and O-containing particle.

When the content of the organic azo-based particles according to an embodiment of the present disclosure is assumed to be 100 area %, the content of the Ti- and O-containing particles is preferably 25 area % or more and 1000 area % or less and more preferably 50 area % or more and 500 area % or less, if the content is more than 1000 area %, the brightness may considerably change. If the content is less than 25 area %, the brightness may also considerably change.

Resin

When the cross-sectional area of the film according to an embodiment of the present disclosure is assumed to be 100 area %, the content of the resin in the film is preferably 5 area % or more and 80 area % or less and more preferably 30 area % or more and 60 area % or less. If the content of the resin according to an embodiment of the present disclosure is less than 5 area %, the adhesiveness to the substrate may deteriorate. If the content of the resin according to an embodiment of the present disclosure is more than 60 area %, the solar reflectance may deteriorate.

The content of the resin in the film according to an embodiment of the present disclosure is measured by the following method. First, cross-sections (3 μm×3 μm) near the surface of the film according to an embodiment of the present disclosure are cut out at five positions and magnified by 100,000 times by transmission electron microscopy (TEM). When the particle size is large, cross-sections (10 μm×10 μm) are cut out at five positions and magnified by 30,000 times by transmission electron microscopy (TEM). Then, the resin is subjected to area analysis at the five positions by energy dispersive X-ray spectroscopy (EDS) to calculate the content per unit area. Finally, the content of the resin in the film according to an embodiment of the present disclosure is calculated from the average of the contents at the five positions, and this value is defined as a content of the resin in the film.

Particle for Adjusting Brightness (Inorganic Pigment)

When the unit cross-sectional area of the film according to an embodiment of the present disclosure is assumed to be 100 area %, the content of the particles (inorganic pigment) for adjusting the brightness in the film is preferably 10 area % or more and 80 area % or less and more preferably 20 area % or more and 60 area % or less. If the content of the particles for adjusting the brightness according to an embodiment of the present disclosure is less than 10 area %, the tinting strength is low, which may make it difficult to adjust the brightness to 50 or more. If the content of the particles for adjusting the brightness according to an embodiment of the present disclosure is more than 80 area %, the film may become brittle.

The content of the particles (inorganic pigment) for adjusting the brightness in the film according to an embodiment of the present disclosure is measured by the following method. First, cross-sections (3 μm×3 μm) near the surface of the film according to an embodiment of the present disclosure are cut out at five positions and magnified by 100,000 times by transmission electron microscopy (TEM). When the particle size is large, cross-sections (10 μm×10 μm) are cut out at five positions and magnified by 30,000 times by transmission electron microscopy (TEM). Then, the particles (inorganic pigment) for adjusting the brightness are subjected to area analysis at the five positions by energy dispersive X-ray spectroscopy (EDS) to calculate the content per unit area. Finally, the content of the particles (inorganic pigment) for adjusting the brightness in the film according to an embodiment of the present disclosure is calculated from the average of the contents at the five positions.

In the case where the particles (inorganic pigment) for adjusting the brightness are titanium oxide particles whose surfaces are coated with silica, if the area analysis shows that silica partly adheres to (coats) the titanium oxide particles, the particles are regarded as a titania whose surface is coated with silica.

Silica Particle

The content of the silica particles can be set to 1 area % or more and 10 area % or less. If the content of the silica particles is less than 1 area %, minute defects of silica that coats the surfaces of the titanium oxide particles cannot be completely filled, which may further cause discoloration in an oxygen-free atmosphere. If the content of the silica particles is more than 10 area %, the haze of a coating film deteriorates, which may deteriorate the reflectance.

The content of the silica particles in the film according to an embodiment of the present disclosure is measured by the following method. First, cross-sections (3 μm×3 μm) near the surface of the film according to an embodiment of the present disclosure are cut out at five positions and magnified by 100,000 times by transmission electron microscopy (TEM). When the particle size is large, cross-sections (10 μm×10 μm) are cut out at five positions and magnified by 30,000 times by transmission electron microscopy (TEM). Then, the silica particles are subjected to area analysis at the five positions by energy dispersive X-ray spectroscopy (EDS) to calculate the content per unit area. Finally, the content of the silica particles is calculated from the average of the contents at the five positions.

Other Additives

The film according to an embodiment of the present disclosure may contain any other additives. Examples of the additives include dispersants, curing agents, curing catalysts, plasticizers, thixotropy-imparting agents, leveling agents, matting agents, preservatives, ultraviolet absorbers, antioxidants, coupling agents, and inorganic fine particles and organic fine particles for adjusting the tinge other than the above fine particles.

Next, the characteristics of the article including the thus-formed film will be described.

Solar Reflectance

A portion of the article according to an embodiment of the present disclosure in which at least the film according to an embodiment of the present disclosure is formed may have a solar reflectance of 60% or more. At a solar reflectance of less than 60%, the temperature-decreasing effect is reduced.

Brightness

A portion of the article according to an embodiment of the present disclosure in which at least the film according to an embodiment of the present disclosure is formed preferably has a brightness of 50 or more and more preferably has a brightness of 71 or more and 80 or less. If the brightness is less than 50, the reflectance decreases, which reduces the temperature-decreasing effect. If the brightness is 80 or more, the portion is whitened, which may deteriorate the antifouling properties.

Range of a* and b*

Each of a* and b* representing the tinge of a portion of the article according to an embodiment of the present disclosure in which at least the film according to an embodiment of the present disclosure is formed can be set to −5 or more and +5 or less. If values of a* and b* are less than −5 or +5 or more, the tinge represented by a* and b* may considerably change when an organic azo-based pigment is faded through irradiation with solar light.

EXAMPLES

Hereafter, suitable examples in the present disclosure will be described.

The preparation of coating materials, the formation of films, and the evaluation of the characteristics of articles including the films in Examples 1 to 12 were performed by the following methods.

Evaluation of Characteristics of Article

The characteristics of an article including a film were evaluated by measuring brightness (L*), a*, and b* using a color difference meter (SE-7700, NIPPON DENSHOKU INDUSTRIES Co., Ltd.). A film according to an embodiment of the present disclosure was formed on a metal plate having a size of 30 mm×30 mm and a thickness of 1 mm to prepare a sample for measurement. The metal plate was formed of a stainless steel, aluminum, titanium, or a magnesium alloy. A coating material according to an embodiment of the present disclosure was applied onto a metal plate formed of a magnesium alloy using a spin coater so as to have a thickness of 50 μm and fired. After the firing, L*, a*, and b* on the film of the metal plate including the film according to an embodiment of the present disclosure were measured using the color difference meter. Then, the sample was subjected to a lightfastness test using a lightfastness tester (SUNTEST XXL+, ATLAS) at an irradiance of 50±2 W/m² (300 nm to 400 nm) at a black panel temperature of 63° C.±3° C. for 200 hours. After the completion of the lightfastness test, L*, a*, and b* on the film of the metal plate including the film according to an embodiment of the present disclosure were measured.

$$\Delta L^* = L^* \text{ after lightfastness test} - L^* \text{ before lightfastness test}$$

If the change in brightness ($\Delta L^*$) is less than 0.3, the film is a good film with a very small change in tinge, if the change in brightness is 0.3 or more and less than 1.0, the film is a good film. If the change in brightness is 1.0 or more, the film is a poor film with a large change in tinge.

Three-Grade Evaluation A to C
- A: Change in brightness (±) is less than 0.3.
- B: Change in brightness (±) is 0.3 or more and less than 1.0.
- C: Change in brightness (±) is 1.0 or more.

Evaluation of Solar Reflectance

Figure 5:
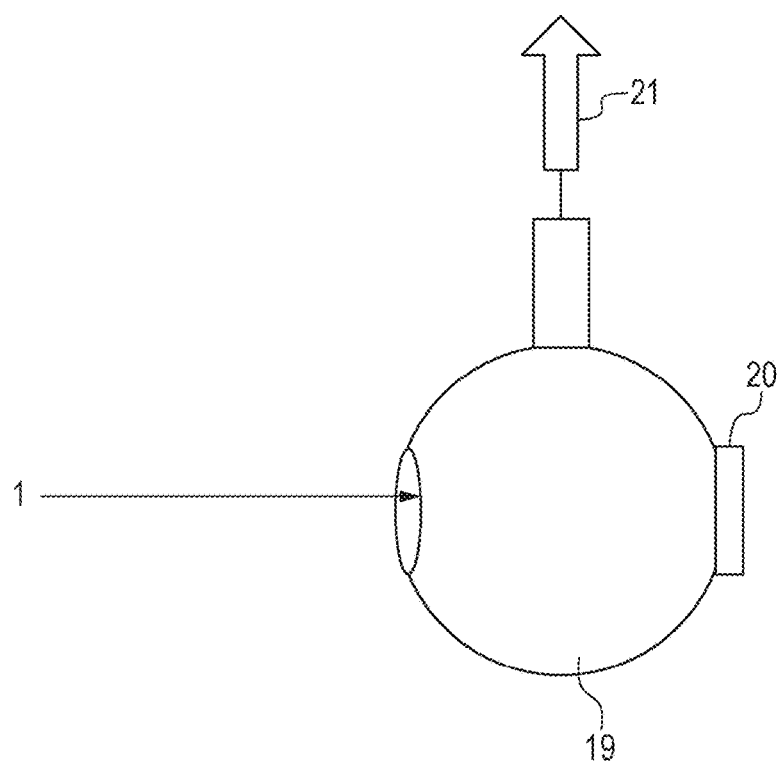
FIG. 5 schematically illustrates the measurement of reflectance with a spectrophotometer.

Hereafter, the evaluation of the solar reflectance will be described. As illustrated in FIG. 5, the reflectance was measured using a spectrophotometer (U-4000, Hitachi High-Technologies Corporation), and then the reflectance was converted to a solar reflectance.

The method for measuring a reflectance will be described. As illustrated in FIG. 5, incident light 1 having a wavelength of 300 nm to 2500 nm was caused to enter an integrating sphere 19. First, a blank formed of an alumina sintered body having a reflectance of 100% was disposed on a test specimen-mounting part 20 that inclines with respect to the incident light 1 by 5°, and a baseline measurement was performed. Subsequently, a test specimen including the film according to an embodiment of the present disclosure formed thereon was disposed on the test specimen-mounting part 20 instead of the blank. Light having a wavelength of 300 nm to 2500 nm was caused to enter the integrating sphere 19 and detected using a detector 21 to measure a reflectance. Then, in conformity with JIS-K5602 (method for determining solar reflectance of coating film), the measured reflectance was multiplied by a weighting value (weighting coefficient) and integrated to calculate a solar reflectance.

A film according to an embodiment of the present disclosure was formed on a metal plate having a size of 30 mm×30 mm and a thickness of 1 mm to prepare a sample for measurement. The metal plate was formed of a stainless steel, aluminum, titanium, or a magnesium alloy. A coating material according to an embodiment of the present disclosure was applied onto a metal plate formed of a magnesium alloy using a spin coater so as to have a thickness of 50 μm and fired. A Cellotape (CT-12M, NICHIBAN Co., Ltd.) was stuck on an upper surface of the film according to an embodiment of the present disclosure. The sample was subjected to a lightfastness test using a lightfastness tester (SUNTEST XXL+, ATLAS) at an irradiance of 50±2 W/m² (300 nm to 400 nm) at a black panel temperature of 63° C.±3° C. for 200 hours. After the completion of the lightfastness test, the Cellotape was removed from the film. After washing with acetone was performed, the reflectance at a wavelength of 300 mm to 2500 nm was measured using a spectrophotometer within 24 hours, and the solar reflectance was calculated in conformity with JIS-K5602.

At a solar reflectance of 70% or more, the film is an excellent film because the temperature-decreasing effect is high. At a solar reflectance of 60% or more and less than 70%, the film is a good film because the temperature-decreasing effect is relatively high. At a solar reflectance of less than 60%, the film is a poor film because the temperature-decreasing effect is reduced.

Three-Grade Evaluation A to C
- A: Solar reflectance is 70% or more.
- B: Solar reflectance is 60% or more and less than 70%.
- C: Solar reflectance is less than 60%.

Heat-Shielding Effect

Figure 6:
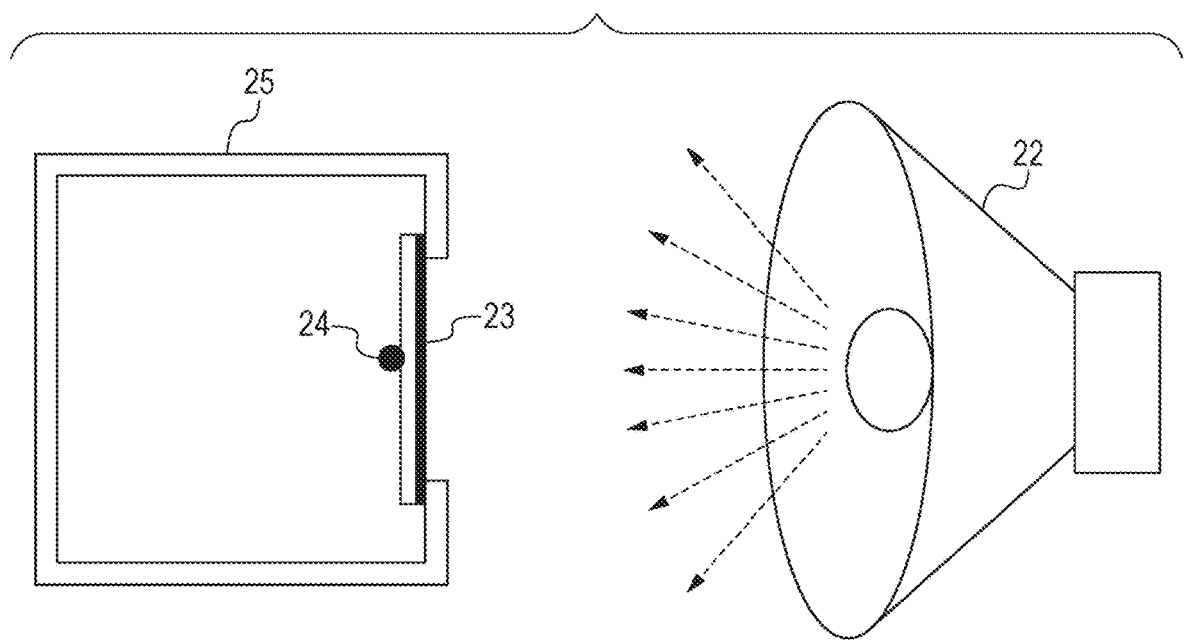
FIG. 6 schematically illustrates a method for evaluating temperature.

FIG. 6 schematically illustrates a method for evaluating temperature. As illustrated in FIG. 6, a lamp 22, a jig 25 for temperature measurement, and a test specimen 23 for temperature evaluation were used for measuring temperature. A film according to an embodiment of the present disclosure was formed on a metal plate having a size of 100 mm×100 mm and a thickness of 1 mm to prepare a test specimen 23 for temperature evaluation. The metal plate was formed of a stainless steel, aluminum, titanium, or a magnesium alloy. A coating material according to an embodiment of the present disclosure was applied onto the metal plate using a spin coater so as to have a thickness of 50 μm and fired. A white corrugated cardboard box having a size of 120 mm×120 mm×120 mm was used as a jig 25 for temperature measurement. A window having a size of 90 mm×90 mm was formed in a portion on which the test specimen 23 for temperature evaluation was to be mounted. The lamp 22 used was a HILUXMT150FD6500K (IWASAKI ELECTRIC Co, Ltd.).

Subsequently, the test specimen 23 for temperature evaluation was mounted on the jig 25 for temperature measurement, and a thermocouple 24 was attached to the back surface of the test specimen 23 for temperature evaluation. The jig 25 for temperature measurement on which the test specimen 23 for temperature evaluation was mounted was disposed so as to have a distance of 100 mm from the lamp 22. Then, the lamp 22 was operated for 60 minutes and the temperature after 60 minutes was measured.

The temperature-decreasing effect was determined by calculating the difference between the temperature measured for the film in each of Examples and the temperature measured for a black blank formed on the surface of the test specimen 23 for temperature evaluation.

The black blank was prepared by applying, onto the surface of the test specimen 23, a coating material prepared by mixing 20 g of carbon black (MA100, Mitsubishi Chemical Corporation), 100 g of epoxy resin (jER 828, Mitsubishi Chemical Corporation), 70 g of an amine curing agent (ST11, Mitsubishi Chemical Corporation), and 20 g of a thinner using a planetary mixer and then firing the coating material.

When the temperature-decreasing effect is 7° C. or higher, the film is a film having a very high heat-shielding effect. When the temperature-decreasing effect is 3° C. or higher and lower than 7° C., the film is a film having a relatively high heat-shielding effect. When the temperature-decreasing effect is lower than 3° C., the film is a film having a low heat-shielding effect.

Three-Grade Evaluation A to C
- A: Temperature-decreasing effect is 7° C. or higher.
- B: Temperature-decreasing effect is 3° C. or higher and lower than 7° C.
- C: Temperature-decreasing effect is lower than 5° C.

Example 1

Preparation of Coating Material

In Example 1, a coating material was prepared by the following method. That is, 125 g of a resin (48.6 vol % in terms of coating film), 0.5 g of organic azo-based particles (0.2 vol % in terms of coating film), and 4.5 g of Ti- and O-containing particles (0.7 vol % in terms of coating film) were weighed. Furthermore, 150 g of particles (inorganic pigment) for adjusting brightness (28.6 vol % in terms of coating film), 5 g of a dispersant (3.5 vol % in terms of coating film), and 100 g of a solvent were weighed. They were stirred using a ball mill for 15 hours to obtain a main agent. One gram of a curing agent (18.4 vol %) was mixed with 10 g of the obtained main agent to prepare a coating material in Example 1.

The resin used was an Olester Q-691 (Mitsui Chemicals, Inc.). The organic azo-based particles used were a CHROMOFINE BLACK A1103 (Dainichiseika Color & Chemicals Mfg. Co., Ltd.). The Ti- and O-containing particles used were #5950 (Asahi sangyo Kaisha, Ltd.). The particles (inorganic pigment) for adjusting brightness were D-970 (SAKAI CHEMICAL INDUSTRY Co., Ltd., average particle size 0.26 μm, titania coated with silica). The curing agent used was a Takenate D-120N (Mitsui Chemicals, Inc.).

Formation of Film

In Example 1, a film was formed by the following method. The coating material was applied onto a metal plate formed of a magnesium alloy using a spin coater so as to have a thickness of 50 μm, dried at room temperature for one night, and then fired at 130° C. for 30 minutes to obtain a film in Example 1.

Examples 2 to 13

In Examples 2 to 13, a coating material and a film were prepared in the same manner as in Example 1, except that materials and conditions listed in Tables 1 and 2 were used.

The $(Ti,Ni,Sb)O_2$ particles used were a Yellow 5000 (Asahi sangyo Kaisha, Ltd.). The hollow silica used was a Sphericel-110P8 (Potters-Ballotini Co., Ltd.). The nickel azo particles used were a C.I. Pigment Yellow 150. The Fe—Zn particles used were a Brown 4123 (Asahi sangyo Kaisha, Ltd.). The Co—Al—Ni—Ti particles used were a Green 2024 (Asahi sangyo Kaisha, Ltd.). The Co—Al particles used were a CoBlue 1024 (Asahi sangyo Kaisha, Ltd.). The $TiO_2$ particles used were HT0110 (TOHO TITANIUM Co., Ltd.).

TABLE 1

| | | | Film in Example 1 | Film in Example 2 | Film in Example 3 | Film in Example 4 | Film in Example 5 | Film in Example 6 |
|---|---|---|---|---|---|---|---|---|
| Film | Resin | Material | acrylic polyol | acrylic polyol | acrylic polyol | acrylic polyol | acrylic polyol | acrylic polyol |
| | | Content (area %) | 48.6 | 49 | 48.3 | 48.6 | 48.6 | 48.6 |
| | Organic azo-based particle | Material | azomethine black | azomethine black | azomethine black | azomethine black | azomethine black | nickel azo |
| | | Content (area %) | 0.22 | 0.1 | 0.4 | 0.22 | 0.22 | 0.22 |
| | Particle containing Ti, O, and at least one inorganic metal or Ti- and O-containing inorganic particle | Material | $(Ti, Sb, Cr)O_2$ | $(Ti, Sb, Cr)O_2$ | $(Ti, Sb, Cr)O_2$ | $(Ti, Ni—Sb)O_2$ | $(Ti, Sb, Cr)O_2$ | $(Ti, Sb, Cr)O_2$ |
| | | Content (area %) | 0.7 | 0.1 | 1 | 0.7 | 0.7 | 0.7 |
| | Titania | Material | titania coated with silica | titania coated with silica | titania coated with silica | titania coated with silica | Hollow silica | titania coated with silica |
| | | Content (area %) | 28.6 | 28.9 | 28.5 | 28.6 | 28.6 | 28.6 |
| | Dispersant | Content | 3.5 | 3.5 | 3.4 | 3.5 | 3.5 | 3.5 |
| | Another pigment | Type | — | — | — | — | — | — |
| | | Content (area %) | — | — | — | — | — | — |
| | Curing agent | Content (area %) | 18.4 | 18.4 | 18.4 | 18.4 | 18.4 | 18.4 |
| Characteristics of film | Brightness (L*) | | 76 | 88 | 71 | 76 | 76 | 80 |
| | a* | | −0.3 | −0.5 | −1 | −0.7 | −0.3 | −0.5 |
| | b* | | 3.1 | 1 | 5.4 | 3.3 | 2.6 | 3.3 |

TABLE 2

| | | | Film in Example 7 | Film in Example 8 | Film in Example 9 | Film in Example 10 | Film in Example 11 | Film in Example 12 | Film in Example 13 |
|---|---|---|---|---|---|---|---|---|---|
| Film | Resin | Material | acrylic polyol | acrylic polyol | acrylic polyol | acrylic polyol | acrylic polyol | acrylic polyol | acrylic polyol |
| | | Content (area %) | 48.5 | 49.4 | 48.1 | 48.6 | 48.6 | 47.5 | 47.5 |
| | Organic azo-based particle | Material | azomethine black | azomethine black | azomethine black | azomethine black | azomethine black | azomethine black | azomethine black |
| | | Content (area %) | 0.22 | 0.22 | 0.22 | 0.22 | 0.22 | 0.94 | 1.11 |

TABLE 2-continued

|  |  |  | Film in Example 7 | Film in Example 8 | Film in Example 9 | Film in Example 10 | Film in Example 11 | Film in Example 12 | Film in Example 13 |
|---|---|---|---|---|---|---|---|---|---|
|  | Particle containing Ti, O, and at least one inorganic metal or Ti- and O-containing inorganic particle | Material | (Ti, Sb, Cr)O$_2$ | (Ti, Sb, Cr)O$_2$/ Co—Al—Ni—Ti | (Ti, Sb, Cr)O$_2$ | (Ti, Sb, Cr)O$_2$ | titania | (Ti, Sb, Cr)O$_2$ | (Ti, Sb, Cr)O$_2$ |
|  |  | Content (area %) | 0.7 | 0.7/0.2 | 1.63 | 0.7 | 0.7 | 1.61 | 1.6 |
|  | Titania | Material | titania coated with silica | titania coated with silica | titania coated with silica | titania coated with silica | titania coated with silica | titania coated with silica | titania coated with silica |
|  |  | Content (area %) | 28.5 | 28.5 | 28.2 | 28.6 | 28.6 | 28.1 | 28 |
|  | Dispersant | Content | 3.4 | 3.4 | 3.4 | 3.4 | 3.5 | 3.5 | 3.4 |
|  | Another pigment | Type | Fe—Zn | — | — | Co—Al | — | — | — |
|  |  | Content (area %) | 0.3 | — | — | 0.1 | — | — | — |
|  | Curing agent | Content (area %) | 18.4 | 18.5 | 18.5 | 18.4 | 18.4 | 18.4 | 18.4 |
| Characteristics of film | Brightness (L*) |  | 71 | 72 | 71 | 73 | 78 | 50 | 40 |
|  | a* |  | 6 | −6 | 2.5 | −5 | −2.1 | −0.4 | −0.1 |
|  | b* |  | 1.7 | −3.2 | 6 | −6 | −2.3 | 3.5 | 2.2 |

Evaluation Result

Tables 3 and 4 show the results of the change in brightness (ΔL*) after the lightfastness test, the solar reflectance (R) after the lightfastness test, and the temperature-decreasing effect before and after the lightfastness test evaluated by the above methods for the films in Examples 1 to 12.

The results were evaluated by whether the change in brightness (ΔL*) was reduced to less than 1.0, desirably less than 0.3, despite the fact that the organic azo-based particles were contained.

For the heat-shielding effect, the solar reflectance is preferably 60% or more and less than 70% and more preferably 70% or more. The temperature-decreasing effect is preferably 3° C. or higher and lower than 7° C. and more preferably 7° C. or higher, Table 3 shows the change in brightness after the lightfastness test, the solar reflectance, and the temperature-decreasing effect evaluated for the film in Example 1 in which acrylic polyol, azomethine black, (Ti,Sb,Cr)O$_2$, titania coated with silica, and a dispersant were used and the brightness was adjusted to 76. The change in brightness was less than 0.3, which was an excellent result. The solar reflectance was 60% or more and less than 70%, which was a good result. The temperature-decreasing effect was 3° C. or higher and lower than 7° C., which was a good result.

Table 3 shows the change in brightness before and after the lightfastness test, the solar reflectance, and the temperature-decreasing effect evaluated for the film in Example 2 in which the content of the azomethine black in Example 1 was decreased to 0.1 vol % and the content of the (Ti,Sb,Cr)O$_2$ was decreased to 0.1 vol %. The change in brightness was less than 0.3, which was an excellent result. The solar reflectance was 70% or more, which was an excellent result. The temperature-decreasing effect was 7° C. or higher, which was an excellent result.

Table 3 shows the change in brightness before and after the lightfastness test, the solar reflectance, and the temperature-decreasing effect evaluated for the film in Example 3 in which the content of the azomethine black in Example 1 was increased to 0.4 vol % and the content of the (Ti,Sb,Cr)O$_2$ was increased to 1 vol %. The change in brightness was less than 0.3, which was an excellent result. The solar reflectance was 60% or more and less than 70%, which was a good result. The temperature-decreasing effect was 3° C. or higher and lower than 7° C., which was a good result.

Table 3 shows the change in brightness before and after the lightfastness test, the solar reflectance, and the temperature-decreasing effect evaluated for the film in Example 4 in which (Ti,Ni—Sb)O$_2$ was used instead of the (Ti,Sb,Cr)O$_2$ in Example 1. The change in brightness was less than 0.3, which was an excellent result. The solar reflectance was 60% or more and less than 70%, which was a good result. The temperature-decreasing effect was 3° C. or higher and lower than 7° C., which was a good result.

Table 3 shows the change in brightness before and after the lightfastness test, the solar reflectance, and the temperature-decreasing effect evaluated for the film in Example 5 in which a hollow silica having heat insulating properties was used instead of the titanium oxide coated with silica in Example 1. The change in brightness was less than 0.3, which was an excellent result. The solar reflectance was less than 60%, but the hollow silica had good heat insulating properties. Therefore, the temperature-decreasing effect was 3° C. or higher and lower than 7° C., which was a good result.

Table 3 shows the change in brightness before and after the lightfastness test, the solar reflectance, and the temperature-decreasing effect evaluated for the film in Example 6 in which nickel azo was used instead of the azomethine black in Example 1, The change in brightness was less than 0.3, which was an excellent result. The solar reflectance was 60% or more and less than 70%, which was a good result. The temperature-decreasing effect was 3° C. or higher and lower than 7° C., which was a good result.

Table 4 shows the change in brightness before and after the lightfastness test, the solar reflectance, and the temperature-decreasing effect evaluated for the film in Example 7 in which Fe—Zn particles serving as another pigment were added to the coating material in Example 1 to adjust a* to +6. The change in brightness was 0.3 or more and less than 1.0, which was a good result. The solar reflectance was 60% or more and less than 70%, which was a good result. The temperature-decreasing effect was 3° C. or higher and lower than 7° C., which was a good result.

Table 4 shows the change in brightness before and after the lightfastness test, the solar reflectance, and the temperature-decreasing effect evaluated for the film in Example 8 in which 0.2 vol % of (Co—Al—Ni—Ti)O$_2$ was added to the coating material in Example 1 to adjust a* to −6. The change in brightness was 0.3 or more and less than 1.0, which was a good result. The solar reflectance was 60% or more and less than 70%, which was a good result. The temperature-decreasing effect was 3° C. or higher and lower than 7° C., which was a good result, Table 4 shows the change in brightness before and after the lightfastness test, the solar reflectance, and the temperature-decreasing effect evaluated for the film in Example 9 in which the content of the (Ti,Sb,Cr)$O_2$ in Example 1 was increased to 1.63 vol % to adjust b* to +6. The change in brightness was 0.3 or more and less than 1.0, which was a good result. The solar reflectance was 60% or more and less than 70%, which was a good result. The temperature-decreasing effect was 3° C. or higher and lower than 7° C., which was a good result.

Cr)$O_2$ was increased to 1.6 vol %. The change in brightness was less than 0.3, which was an excellent result. However, the brightness excessively decreased and thus the solar reflectance was as low as less than 60%. The temperature-decreasing effect was lower than 3° C., which was a poor result. As is clear from this result, even if a large amount of azomethine black is added, the change in brightness can be suppressed by adding Ti- and O-containing particles. However, the addition of a large amount of azomethine black decreases the brightness and thus decreases the solar reflectance, thereby reducing the temperature-decreasing effect. Therefore, the brightness is found to be desirably adjusted to 50 or more.

TABLE 3

|  | Film in Example 1 | Film in Example 2 | Film in Example 3 | Film in Example 4 | Film in Example 5 | Film in Example 6 |
| --- | --- | --- | --- | --- | --- | --- |
| Change in brightness | A | A | A | A | A | A |
| Solar reflectance | B | A | B | B | C | B |
| Heat-shielding effect | B | A | B | B | B | B |

TABLE 4

|  | Film in Example 7 | Film in Example 8 | Film in Example 9 | Film in Example 10 | Film in Example 11 | Film in Example 12 | Film in Example 13 |
| --- | --- | --- | --- | --- | --- | --- | --- |
| Change in brightness | B | B | B | B | B | A | A |
| Solar reflectance | B | B | B | B | B | B | C |
| Heat-shielding effect | B | B | B | B | B | B | C |

Table 4 shows the change in brightness before and after the lightfastness test, the solar reflectance, and the temperature-decreasing effect evaluated for the film in Example 10 in which Co—Al was added to the coating material in Example 1 to adjust b* to −6. The change in brightness was 0.3 or more and less than 1.0, which was a good result. The solar reflectance was 60% or more and less than 70%, which was a good result. The temperature-decreasing effect was 3° C. or higher and lower than 7° C., which was a good result.

Table 4 shows the change in brightness before and after the lightfastness test, the solar reflectance, and the temperature-decreasing effect evaluated for the film in Example 11 in which titania was added instead of the (Ti,Sb,Cr)$O_2$ in Example 1. The change in brightness was 0.3 or more and less than 1.0, which was a good result. The solar reflectance was 60% or more and less than 70%, which was a good result. The temperature-decreasing effect was 3° C. or higher and lower than 7° C., which was a good result.

Table 4 shows the change in brightness before and after the lightfastness test, the solar reflectance, and the temperature-decreasing effect evaluated for the film in Example 12 in which the content of the azomethine black in Example 1 was increased to 0.94 vol % and the content of the (Ti,Sb,Cr)$O_2$ was increased to 1.61 vol % to adjust the brightness to 50, The change in brightness was less than 0.3, which was an excellent result. The solar reflectance was 60% or more and less than 70%, which was a good result. The temperature-decreasing effect was 3° C. or higher and lower than 7° C., which was a good result.

Table 4 shows the change in brightness before and after the lightfastness test, the solar reflectance, and the temperature-decreasing effect evaluated for the film in Example 13 in which the content of the azomethine black in Example 1 was increased to 1.11 vol % and the content of the (Ti,Sb, Comparative Examples 1 and 2

The preparation of a coating material, the formation of a film, the evaluation of the characteristics of the film, the evaluation of the change in brightness, the evaluation of the solar reflectance, and the evaluation of the temperature-decreasing effect for comparison were performed in the same manner as in Examples 1 to 13. Only the difference from Examples 1 to 13 will be described below.

Table 5 shows the materials for the films in Comparative Examples 1 and 2 and the contents of the materials. Table 6 shows the evaluation results of the films in Comparative Examples 1 and 2.

Table 5 shows the change in brightness before and after the lightfastness test, the solar reflectance, and the temperature-decreasing effect evaluated for the film in Comparative Example 1 in which Fe—Cr (Black 6350, Asahi sangyo Kaisha, Ltd.) was added instead of the azomethine black in Example 1. Since the organic azo-based particles were not contained, the change in brightness was as small as less than 0.3. However, the solar reflectance was less than 60%, which was a poor result. The temperature-decreasing effect was lower than 3° C., which was a poor result.

Table 5 shows the change in brightness before and after the lightfastness test, the solar reflectance, and the temperature-decreasing effect evaluated for the film in Comparative Example 2 in which (Ti,Sb,Cr)$O_2$ was not added to the coating material in Example 1. The change in brightness was 1.0 or more, which was a poor result. The solar reflectance was 60% or more and less than 70%, which was a good result. The temperature-decreasing effect was 3° C. or higher and lower than 7° C., which was a good result.

TABLE 5

|  |  |  | Comparative Example 1 | Comparative Example 2 |
|---|---|---|---|---|
| Film | Resin | Material | acrylic polyol | acrylic polyol |
|  |  | Content (area %) | 48.6 | 49.3 |
|  | Organic azo-based particle | Material | Fe—Cr | azomethine black |
|  |  | Content (area %) | 0.22 | 0.22 |
|  | Particle containing Ti, O, and at least one inorganic metal or Ti- and O-containing inorganic particle | Material | (Ti, Sb, Cr)$O_2$ | — |
|  |  | Content (area %) | 0.74 | — |
|  | Titania | Material |  | titania coated with silica |
|  |  | Content area % | 28.6 | 28.6 |
|  | Dispersant | Content | 3.5 | 3.5 |
|  | Another pigment | Type | — | — |
|  |  | Content (area %) | — | — |
|  | Curing agent | Content (area %) | 18.4 | 18.4 |
| Characteristics of film |  | Brightness (L*) | 72 | 76 |
|  |  | a* | 2.4 | −0.3 |
|  |  | b* | 1.7 | 3.1 |

TABLE 6

|  | Film in Comparative Example 1 | Film in Comparative Example 2 |
|---|---|---|
| Change in brightness | A | C |
| Solar reflectance | C | B |
| Heat-shielding effect | C | B |

Second Embodiment

An article according to an embodiment of the present disclosure on which a film having good heat-shielding properties and water resistance has been formed will be described with reference to FIGS. 7A to 7D. The same description as that in the first embodiment may be omitted.
Material FIGS. 7A to 7D illustrate an article in which a film 122 is formed on at least part of a surface 121 of a substrate 120. FIG. 7A is a sectional view of the article according to this embodiment. FIG. 7B is a schematic enlarged view of a region 125 in FIG. 7A. FIG. 7C illustrates aggregated silica particles. FIG. 7D is a SEM image of a cross-section of the article. FIG. 7D illustrates an example in which the substrate 120 includes a primer layer. In FIGS. 7A to 7D, the article according to this embodiment includes a substrate 120 and a film 122. The film 122 includes at least a resin 126 and particles 127 having an average particle size of 100 nm or more and 400 nm or less. The film 122 according to this embodiment includes a region 124 containing the particles 127 having an average particle size of 100 nm or more and 400 nm or less and a region 123 not containing the particles 127 having an average particle size of 100 nm or more and 400 nm or less. In this specification, the region containing the particles 127 having an average particle size of 100 nm or more and 400 nm or less is referred to as a particle region 124. The region not containing the particles 127 having an average particle size of 100 nm or more and 400 nm or less is referred to as a resin region 123.
Resin Next, the resin 126 contained in the film 122 according to this embodiment will be described.

Examples of the resin in this embodiment include epoxy resin, urethane resin, acrylic resin, urethane-acrylic resin, phenolic resin, and alkyd resin. These resins may be used alone or in combination of two or more.

The content of the resin 126 according to this embodiment is preferably 10 area % or more and 80 area % or less and more preferably 15 area % or more and 70 area % or less in the cross-section of the film. In this specification, the cross-section of the film is a cross-section that is parallel to a direction normal to the surface 121 of the substrate 120 or a surface 1220 of the film 122 and that has an area of at least 30 µm×30 µm. The cross-section is desirably a cross-section parallel to the normal direction, but may be a cross-section that inclines by about 10° with respect to the normal direction. If the thickness is 30 µm or less, the one side of the cross-section may be 30 µm or less.

If the content of the resin 126 according to this embodiment is less than 10 area %, the adhesiveness to the substrate 120 may deteriorate. If the content of the resin 126 according to this embodiment is more than 80 area %, the solar reflectance may deteriorate. The content of the resin 126 according to this embodiment is measured by the following method. First, samples having a thickness of 300 nm and a size of 5 µm×5 µm are cut out from the film 122 according to this embodiment at five positions and magnified by 100,000 times by transmission electron microscopy (TEM). Then, the resin is subjected to area analysis at the five positions by energy dispersive X-ray spectroscopy (EDS) to calculate the content per unit area. Finally, the content of the resin 126 in the film 122 according to an embodiment of the present disclosure is calculated from the average of the contents at the five positions. In this embodiment, the content calculated by this method is expressed in units of area %.
White Pigment Next, a white pigment (may be referred to as first particles or simply particles in this specification) that is particles 127 contained in the film 122 according to this embodiment will be described. The film 122 according to this embodiment may have a high solar reflectance and may have a white color and a high refractive index. When the film 122 contains the particles 127, the film 122 has a white color and a high refractive index. The particles 127 are particles of at least one of titania, alumina, zirconia, or zinc oxide. In particular, titania particles which have a high refractive index and whose surfaces are coated with silica can be used because the photocatalytic activity can be suppressed and thus the deterioration of the surrounding resin can be reduced.

The average particle size of the particles 127 can be set to 100 nm or more and 400 nm or less, if the average particle size is less than 100 nm, it is difficult to reflect solar light. If the average particle size is more than 400 nm, the water resistance deteriorates. Although specifically described later, water is taken into the film through the interface between the resin 126 and the particles 127 because of the difference in hydrophilicity between the resin 126 and the particles 127. Furthermore, if the average particle size is more than 400 nm, a continuous contact area with the resin 126 increases and a very large amount of water is taken into a part of the film, which considerably decreases the water resistance. The particle size of the particles 127 according to this embodiment is determined by the following method. First, samples having a thickness of 300 nm and a size of 5 μm×5 μm are cut out from the film 122 according to this embodiment at five positions and magnified by 100,000 times by transmission electron microscopy (TEM). Then, the particles 127 are subjected to area analysis at the five positions by energy dispersive X-ray spectroscopy (EDS) to determine the particle size of each particle, and the average of the particle sizes is calculated. Finally, the average of the particle sizes at the five positions is determined. The average at the five positions is defined as an average particle size of the particles 127 contained in the film according to this embodiment.

The content of the particles 127 according to this embodiment is preferably 10 area % or more and 60 area % or less and more preferably 15 area % or more and 50 area % or less in the cross-section of the film 122 according to this embodiment. If the content of the particles 127 is less than 10 area %, the hiding power for solar light decreases and the film 122 does not function as a film having good heat-shielding properties. If the content of the particles 127 according to this embodiment is more than 90 area %, the film may become brittle. The content of the particles 127 is measured by the following method. First, samples having a thickness of 300 nm and a size of 5 μm×5 μm are cut out from the film according to this embodiment at five positions and magnified by 100,000 times by transmission electron microscopy (TEM). Then, the particles are subjected to area analysis at the five positions by energy dispersive X-ray spectroscopy (EDS) to calculate the content per unit area. Finally, the content of the particles 127 in the film 122 according to an embodiment of the present disclosure is calculated from the average of the contents at the five positions. In this embodiment, the content calculated by this method is expressed in units of area %.

Silica Particle

The film 122 according to this embodiment may contain silica particles 128. The number-average particle size of the silica particles 128 is preferably 50 nm or more and 350 nm or less and more preferably 150 nm or more and 300 nm or less. If the average particle size of the silica particles 128 is less than 50 nm, the thixotropy of a coating material for forming the film decreases, which deteriorates the application property. The fine particles may have, for example, a spherical shape, a globular shape, an ellipsoidal shape, a rectangular parallelepiped shape, a cubic shape, or a combined shape of the foregoing, or an indefinite shape.

The particle size of the silica particles 128 according to this embodiment is a number-average particle size. Before the coating material is applied, the average particle size of the silica particles 128 can be measured by a dynamic light scattering method. When the average particle size is measured after formation of the film, samples having a thickness of 300 nm and a size of 5 μm×5 μm are cut out from the film according to this embodiment at five positions and magnified by 100,000 times by transmission electron microscopy (TEM). Then, the silica particles 128 are subjected to area analysis at the five positions by energy dispersive X-ray spectroscopy (EDS) to determine the particle size of each silica particle 128, and the average of the particle sizes is calculated. Finally, the average of the particle sizes at the five positions is determined. The average at the five positions is defined as an average particle size of the silica particles contained in the film according to this embodiment. In this embodiment, for example, when silica particles 128 having a particle size of 10 nm or more and 50 nm or less are aggregated to form secondary particles as illustrated in FIG. 7C, the application property can be improved when the length of the secondary particles in a long-side direction is 50 μm or more and 350 nm or less. In particular, branched silica particles constituted by chains of silica particles 128 having a globular shape can be selected. When the coating material for forming a light shielding film is applied, the branched silica particles constituted by chains of silica particles 128 having a globular shape are suitable because the space formed by the silica particles 128 increases and thus the particles 127 can readily move.

The content of the silica particles 128 is preferably 2.5 area % or more and 15.0 area % or less and more preferably 2.5 area % or more and 10.0 area % or less in the cross-section of the film according to this embodiment. If the content of the silica particles 128 is less than 2.5 area %, the thixotropy of a coating material decreases, which deteriorates the application property. If the content of the silica particles 128 is more than 15.0 area % the heat-shielding properties deteriorate. The content of the silica particles 128 is measured by the following method. First, samples having a thickness of 300 nm and a size of 5 μm×5 μm are cut out from the film according to this embodiment at five positions and magnified by 100,000 times by transmission electron microscopy (TEM). Then, the silica particles 128 are subjected to area analysis at the five positions by energy dispersive X-ray spectroscopy (EDS) to calculate the content per unit area. Finally, the content of the silica particles 128 in the film according to an embodiment of the present disclosure is calculated from the average of the contents at the five positions. In this embodiment, the content calculated by this method is expressed in units of area %.

Coloring Agent

The film 122 according to this embodiment may optionally contain, as a coloring agent, a pigment other than the white pigment serving as the particles 127 to allow the external appearance to have a design. In this specification, the pigment other than the white pigment may be simply referred to as a "pigment".

The pigment according to this embodiment is preferably capable of adjusting the brightness (L*) of the heat-shielding film to 71 or more and is more preferably capable of adjusting the brightness to 71 or more and 85 or less. If the brightness of the heat-shielding film according to this embodiment is less than 71, the solar reflectance decreases, which reduces the temperature-decreasing effect. If the brightness of the heat-shielding film according to an embodiment of the present disclosure is more than 85, the amount of visible light absorbed by the pigment decreases, which may give a feeling of glare due to reflection of visible light. The pigment according to this embodiment may reflect or transmit infrared rays.

The pigment according to this embodiment is a coloring agent and may be an organic pigment, an inorganic pigment, or a combination of the organic pigment and the inorganic pigment.

The brightness in this embodiment is a value measured using a color difference meter (SE-7700, NIPPON DENSHOKU INDUSTRIES Co., Ltd.).

Examples of the organic pigment include azomethine black and perylene pigments. Examples of the inorganic pigment include Co—Zn—Si, Co—Al, Co—Al—Cr, Co—Al—Cr—Zn, Co—Al—Zn—Ti, Co—Ni—Zn—Ti, Ti—Cr—Sb, Ti—Fe—Zn, Fe—Zn, and Fe—Cr. Other examples of the inorganic pigment include Mn—Bi, Co—Cr—Zn—Sb, Cu—Cr, Cu—Cr—Mn, Cu—Fe—Mn, Mn—Y, Mn—Sr, Co—Cr—Zn—Al—Ti, Co—Cr—Zn—Ti, Ti—Cr—Sb, and P—Ba—Sr.

Organic Pigment

The organic azo-based particles may be any particles as long as the organic azo-based particles are particles of a compound having an azo group. Examples of the color of the organic azo-based particles according to this embodiment include black-based colors, yellow-based colors, red-based colors, and orange-based colors. A black-based color can be employed because the change in tinge (a* and b*) is small when fading is caused by solar light. The solar reflectance can be set to be high, and a material having a solar reflectance of more than 10% achieved by only organic azo-based particles can be selected. Examples of the organic azo-based particles include particles of nickel azo pigments, insoluble azo pigments, soluble azo pigments, high-molecular-weight azo pigments, and azomethine azo pigments. These organic azo-based particles may be used alone or in combination of two or more.

The average particle size of the organic pigment according to this embodiment is preferably 0.1 µm or more and 5.0 µm or less and more preferably 0.1 µm or more and 2.0 µm or less. If the average particle size of the organic pigment according to this embodiment is less than 0.1 µm, the surface area of the particles increases. Consequently, the light resistance deteriorates, which may cause discoloration. If the average particle size of the organic pigment according to this embodiment is more than 5.0 µm, the degree of irregularities of a coating film increases and the thickness precision deteriorates. Consequently, when this embodiment is applied to a lens barrel, the precision of focusing and the like may deteriorate.

The average particle size in this embodiment is an average of the particle sizes of a plurality of resin particles. The average particle size of resin particles is determined by dispersing the particles in water and performing analysis by a laser scattering method. In this embodiment, the average particle size of resin particles is a volume-average particle size.

The organic pigment may be particles having any shape. Examples of the shape include a globular shape, a cubic shape, an elliptical shape, a plate shape, a layered shape, a chain shape, a hollow shape, a star shape, a needle shape, and an odd shape. In particular, for example, a plate shape, a layered shape, and a chain shape that readily causes segregation to the air interface side due to aggregation of the organic pigment can be employed.

These organic pigments may be used alone or in combination of two or more as long as the design and the heat-shielding properties are not impaired.

When the total amount of the coating material is assumed to be 100 wt %, the content of the organic pigment in the coating material according to this embodiment is preferably 0.01 wt % or more and 1.0 wt % or less and more preferably 0.015 wt % or more and 0.5 wt % or less. If the content of the organic pigment is less than 0.01 wt %, the brightness of the film excessively increases, which may deteriorate the design and may also deteriorate the antifouling properties. If the content of the organic pigment is 1.0 wt % or more, the brightness of the film excessively decreases, which deteriorates the heat-shielding properties.

Inorganic Pigment

The inorganic pigment used in this embodiment may be any inorganic pigment as long as the inorganic pigment has good heat-shielding properties, and can contain titania particles whose surfaces are coated with silica. In particular, the inorganic pigment further contains a colored inorganic pigment for adjusting the color. The inorganic pigment may contain Ti- and O-containing particles whose surfaces are not coated. The Ti- and O-containing particles whose surfaces are not coated may be the colored inorganic pigment. In this embodiment, the Ti- and O-containing particles whose surfaces are not coated may be simply referred to as Ti- and O-containing particles.

Since titania itself has a high refractive index, the refractive index of the film is easily adjusted to a desired refractive index. The tinge of the coating film is also easily adjusted to a desired tinge because of the bright color of titania itself. Furthermore, a large number of titania products containing sufficiently fine particles are commercially available at a relatively low cost and thus titania can be suitably used.

The content of the titania particles whose surfaces are coated with silica in the film according to this embodiment is preferably 10 wt % or more and 70 wt % or less and more preferably 20 wt % or more and 60 wt % or less relative to the resin composition. If the content is less than 10 wt %, the infrared reflection effect sometimes cannot be sufficiently produced. If the content is more than 70 wt %, a sufficient film quality is sometimes not achieved. When particles whose surfaces are coated with silica are used, the photocatalytic activity can be suppressed, which can suppress the deterioration of the surrounding resin.

The average particle size of the titania particles whose surfaces are coated with silica according to this embodiment is preferably 0.1 µm or more and 1.5 µm or less and more preferably 0.1 µm or more and 1.0 µm or less. If the average particle size is less than 0.1 µm, the surface area of the particles increases and the titania particles whose surfaces are coated with silica are easily subjected to aggregation, which makes it difficult to suitably disperse the titania particles in the film. Although specifically described later, if the average particle size is more than 1.5 µm, the segregation of the organic pigment to the air interface side is inhibited, and the design and the heat-shielding properties cannot be sufficiently achieved. The titania particles whose surfaces are coated with silica according to this embodiment are defined as particles in which at least part of the surfaces is coated with silica. The average particle size of the titania particles whose surfaces are coated with silica according to this embodiment indicates an equivalent spherical diameter of particles not subjected to aggregation.

The titania particles whose surfaces are coated with silica according to this embodiment can be produced by a publicly known method such as a gas phase method or a liquid phase method as long as a desired refractive index and a desired average particle size are satisfied. Examples of the method include a method in which a metal powder is charged into a flame and burned in an atmosphere containing at least oxygen to synthesize titanium dioxide fine particles and a sol-gel method in which titanium alkoxide is subjected to hydrolysis and polycondensation in the presence of a catalyst. Titania is known to have a crystalline structure such as a rutile structure or an anatase structure, which exhibits a higher refractive index than an amorphous structure. However, titania having any crystalline form can be suitably used as long as a desired particle size is satisfied.

The inorganic pigment according to this embodiment may contain a colored inorganic pigment in addition to the titania particles whose surfaces are coated with silica. The content of the infrared reflective colored inorganic pigment according to this embodiment is preferably 0.01 wt % or more and 2.0 wt % or less and more preferably 0.02 wt % or more and 1.5 wt % or less. If the content of the infrared reflective colored inorganic pigment according to this embodiment is less than 0.01 wt %, the photocatalysis during irradiation with solar light is low, which may considerably change the tinge of the external appearance of the film according to this embodiment. If the content of the infrared reflective colored inorganic pigment according to this embodiment is more than 2.0 wt %, the heat-shielding properties may deteriorate. The infrared reflective colored inorganic pigment according to this embodiment can be uniformly dispersed in the film.

The inorganic pigment according to this embodiment may further contain Ti- and O-containing particles whose surfaces are not coated. The Ti- and O-containing particles are hardly coated with or are not coated with silica or the like having light resistance because the molecular chain of a resin needs to be cleaved by photocatalysis. This is because the brightness of the film is intended to be decreased as a result of irradiation with solar light by using photocatalysis of the Ti- and O-containing particles whose surfaces are not coated. The reason for this is described below. The organic azo-based particles serving as an organic pigment are a colored pigment having a chemical structure of an azo group R—N=N—R' in a molecule. The organic azo-based particles have a higher infrared reflectivity than inorganic pigments. However, when the organic azo-based particles are irradiated with solar light, the azo group is cleaved into 2R and $N_2$. The organic azo-based particles exhibit a color by N=N contained therein and the surrounding atomic arrangement. Therefore, if N=N is cleaved, the color disappears, which increases the brightness. That is, the color of the film formed on the surface of the article such as an optical apparatus may considerably change. This change remarkably appears as the content of the organic azo-based particles decreases.

$TiO_2$ in the Ti- and O-containing particles 10 is excited by photocatalysis due to solar light and excited Ti- and O-containing particles are formed. The Ti- and O-containing particles excited by solar light release electrons ($e^-$) into the resin, and the molecular chain of the resin is cleaved by electron energy. As a result, the resin becomes a discolored resin and thus the brightness decreases.

In the film according to an embodiment of the present disclosure, the brightness of the organic azo-based particles increases as a result of the is irradiation with solar light while the brightness of the Ti- and O-containing particles decreases. On the whole, the discoloration is suppressed by the cancellation effect. The Ti- and O-containing particles include particles containing only Ti and O (e.g., titania particles) and/or particles containing at least one inorganic metal in addition to Ti and O. Examples of the particles containing at least one inorganic metal in addition to Ti and O according to this embodiment include (Ti,Ni,Sb)Ox, (Ti,Cr,Sb)Ox, (Ti,Fe,Zn)Ox, (Co,Cr,Zn,Al,Ti)Ox, (Co,Cr,Zn,Ti)Ox, and (Co,Al,Ni,Ti)Ox, Examples of the Ti- and O-containing particles according to an embodiment of the present disclosure include (Ti,Ni,Sb)Ox, (Ti,Cr,Sb)Ox, (Ti,Fe,Zn)Ox, (Co,Cr,Zn,Al,Ti)Ox, (Co,Cr,Zn,Ti)Ox, and (Co,Al,Ni,Ti)Ox. When the Ti- and O-containing particles are contained, the content can be set to 1.6 wt % or less.

The pigment according to this embodiment may be a pigment of any color. Examples of the color include black, brown, yellow, red, blue, purple, pink, green, and orange. These pigments may be used alone or in combination of two or more.

The content of the pigment according to this embodiment can be set to 15 area % or less in the cross-section of the film according to this embodiment. If the content of the pigment according to an embodiment of the present disclosure is more than 15 area %, the tinge of the coating film deepens, which may decrease the brightness. The content of the pigment is measured by the following method. First, samples having a thickness of 300 nm and a size of 5 µm×5 µm are cut out from the film according to this embodiment at five positions and magnified by 100,000 times by transmission electron microscopy (TEM). Then, the pigment is subjected to area analysis at the five positions by energy dispersive X-ray spectroscopy (EDS) to calculate the content per unit area. Finally, the content of the pigment in the film according to an embodiment of the present disclosure is calculated from the average of the contents at the five positions. In this embodiment, the content calculated by this method is expressed in units of area %.

Other Additives

The film used for the optical apparatus according to an embodiment of the present disclosure may contain any other additives. Examples of the additives include dispersants, curing agents, curing catalysts, plasticizers, thixotropy-imparting agents, leveling agents, matting agents, preservatives, ultraviolet absorbers, antioxidants, coupling agents, and inorganic fine particles and organic fine particles for adjusting the tinge other than the above fine particles.

Next, a method for improving the water resistance while maintaining the heat-shielding effect of a heat-shielding film will be described.

Method for Improving Water Resistance while Maintaining Heat-Shielding Effect of Heat-Shielding Film Water Resistance of Heat-Shielding Film The film 122 containing the resin 126 and the particles 127 having an average particle size of 100 nm or more and 400 nm or less absorbs water from the surface of the film on a rainy weather or in a high-humidity atmosphere. This is because water is taken into the film through the interface between the resin 126 and the particles 127 because of the difference in hydrophilicity between the resin 126 and the particles 127 having an average particle size of 100 nm or more and 400 nm or less. The water is increasingly taken into the film through the interface between the resin 126 and the particles 127 and is also unevenly distributed to an interface 129 between the film 122 and the substrate 120. If the film 122 and the substrate 120 expand or shrink in the presence of the water because of temperature change, the difference in expansion coefficient between the film 122 and the substrate 120 causes defects such as film floating and separation at the interface 129 between the film 122 and the substrate 120 and swelling due to the reaction between the substrate 120 and water. To achieve good heat-shielding properties, the content of the particles 127 having an average particle size of 100 nm or more and 400 nm or less in the film is desirably increased as much as possible. However, this increases the number of paths of water in the film, which increases the amount of water at the interface 129 between the film 122 and the substrate 120.

Method for Improving Water Resistance while Maintaining Heat-Shielding Effect of Heat-Shielding Film According to Embodiment of the Present Disclosure As described above, it has been found that improvements in both the heat-shielding properties and the water resistance cannot be achieved in the related art.

As a result of thorough studies on the method for maintaining heat-shielding properties and improving water resistance, the present inventor has found that a resin region 123 which does not contain the particles 127 having an average particle size of 100 nm or more and 400 nm or less and which divides the interfaces between the resin 126 and the particles 127 is disposed in the film 122. Specifically, a resin region 123 that does not contain the particles 127 having an average particle size of 100 nm or more and 400 nm or less is disposed in a region (particle region 124) that contains the particles 127. Thus, the water resistance can be improved while the heat-shielding properties are maintained.

Resin Region

The region 123 (resin region) that does not contain the particles 127 having an average particle size of 100 nm or more and 400 nm or less according to this embodiment will be described.

The resin region 123 illustrated in FIGS. 7A to 7D is a region containing at least the resin 126 and optionally the above-described additives. Examples of the resin 126 include epoxy resin, urethane resin, acrylic resin, urethane-acrylic resin, phenolic resin, and alkyd resin.

The refractive index in the resin region can be set to be lower than that in the particle region. When the refractive index in the resin region is lower than that in the particle region, solar light can be more efficiently reflected, which can improve the heat-shielding properties.

To achieve a low refractive index, a resin having a low refractive index or particles having a low refractive index can be used.

The resin having a low refractive index may be a resin having a refractive index of 1.6 or less, such as a silicone resin, a fluororesin, or a resin containing a fluorine group. Examples of the type of silicone resin include methyl type, methyl/phenyl type, propyl/phenyl type, epoxy-modified type, alkyd-modified type, polyester-modified type, rubber type, and resins and oligomers thereof. These resins may be used alone or in combination of two or more.

The refractive index of the resin region may be decreased by dispersing particles (referred to as "low-refractive-index particles") having a particle size of less than 100 nm and a refractive index of 1.6 or less in the resin. Alternatively, particles having a low refractive index may be dispersed in a resin having a low refractive index.

The low-refractive-index particles may be organic particles or inorganic particles. The low-refractive-index particles are, for example, particles containing at least one of fluorine, $MgF_2$, or silica. The low-refractive-index particles may have a globular shape or an indefinite shape and may be hollow or porous particles.

The content of the resin having a low refractive index according to this embodiment is preferably 20 vol % or more and 100 vol % or less and more preferably 30 vol % or more and 90 vol % or less. If the content of the resin according to an embodiment of the present disclosure is less than 20 vol %, the adhesiveness of the resin region 123 to the particle region 124 adjacent to the resin region 123 may deteriorate. Similarly, if the content of the resin having a low refractive index according to this embodiment is more than 90 vol %, the adhesiveness of the resin region 123 to the particle region 124 adjacent to the resin region 123 may deteriorate.

The shape and area of the resin region 123 can be determined by performing a typical SEM observation on a film cross-section perpendicular to the surface 1220 of the film 122. The SEM observation is performed at an acceleration voltage of 5 kV with a magnification of 1000 times.

The width D of the resin region 123 in a direction normal to the surface of the substrate 120 is preferably 200 nm or more and 2000 nm or less and more preferably 200 nm or more and 1000 nm or less. If the width D of the resin region 123 in the direction normal to the surface of the substrate 120 is less than 200 nm, the resin region 123 may fail to contribute to the water resistance. If the width D is more than 2000 nm, the heat-shielding properties may deteriorate.

The width E of the resin region 123 in a direction parallel to the surface of the substrate 120 is preferably 3 μm or more and 100 μm or less and more preferably 5 μm or more and 50 μm or less. If the width E is 3 μm or less, the resin region 123 may fail to contribute to the water resistance. If the width E is more than 100 μm, defects such as film separation may be caused.

The total area of the resin regions 123 distributed in the film 122 is preferably 0.05 area % or more and 13 area % or less and more preferably 0.1 area % or more and 5 area % or less relative to the whole cross-sectional area of the film. If the total area is less than 0.05 area %, the resin regions 123 may fail to contribute to the water resistance. If the total area is more than 13 area %, the heat-shielding properties may considerably deteriorate.

Film Configuration

The film formed on the article according to this embodiment, in particular, on an upper surface of an optical apparatus is formed on the outer side relative to the substrate. The film may closely adhere to the substrate or a primer layer for improving the adhesiveness may be disposed between the substrate and the film formed on the upper surface of the optical apparatus. When a metal substrate is used, chemical conversion treatment may be optionally performed.

Substrate

The substrate may be formed of any material such as a metal or a plastic. Examples of the metal include aluminum, titanium, stainless steels, magnesium alloys, and lithium-magnesium alloys. Examples of the plastic include polycarbonate resin, acrylic resin, ABS resin, and fluororesin.

The substrate may have any thickness. The thickness is preferably 0.5 mm or more and 5 mm or less and more preferably 0.5 mm or more and 2 mm or less. If the thickness is less than 0.5 mm, it is difficult to maintain the shape of a lens barrel. If the thickness is more than 5 mm, the cost of members increases.

Primer

A primer may be used to improve the adhesiveness between the substrate and the film.

The primer may be formed of any material. Examples of the material include epoxy resin, urethane resin, acrylic resin, silicone resin, and fluororesin. The primer may contain the particles according to an embodiment of the present disclosure, particles other than the particles according to an embodiment of the present disclosure, a coloring agent, a dispersant, a curing agent, a curing catalyst, a plasticizer, a thixotropy-imparting agent, a leveling agent, an organic coloring agent, an inorganic coloring agent, a preservative, an ultraviolet absorber, an antioxidant, a coupling agent, and a solvent residue.

The thickness of the primer is preferably 2 μm or more and 30 μm or less and more preferably 5 μm or more and 20 μm or less. If the thickness is less than 2 μm, the adhesiveness of the film sometimes decreases. If the thickness is more than 30 µm, the positioning accuracy may be adversely affected.

Thickness of Film According to this Embodiment

The thickness of the film according to this embodiment can be set to 10 µm or more and 70 µm or less. If the thickness is less than 10 µm, the solar reflectance may deteriorate. If the thickness is more than 70 µm, the center may be shifted during assembly with other components, which may adversely affect the positioning accuracy of the optical apparatus.

Method for Producing Article According to this Embodiment

Method for Forming Film

The film of the article according to this embodiment can be formed by any coating method and any curing method as long as a heat-shielding coating material according to this embodiment can be uniformly applied so as to have a thickness of 10 µm or more and 70 µm or less.

Examples of the coating method of the film for the article according to this embodiment, in particular, for the optical apparatus include coating with a brush, spray coating, dip coating, transfer, and inkjet coating. The film may be constituted by a single coating layer or a plurality of coating layers, or may be grained to achieve good design.

The curing method of the film for the article according to this embodiment, in particular, for the optical apparatus may be a method in which the coating material is left to stand at room temperature, a method in which curing is facilitated by any heating process, or a method in which ultraviolet rays are applied. In the method for performing curing through a heating process, for example, a heating furnace, a heater, or infrared heating may be employed. The curing temperature is preferably room temperature to 400° C. and more preferably room temperature to 200° C.

Method for Forming Resin Region

After the film (particle region) is formed by the above method, a material used for the resin region can be applied onto a part of the surface of the film (particle region) by a method such as transfer or inkjet coating to form a resin region. By further forming a film (particle region) after the formation of the resin region, the resin region can be formed inside the film (between the particle region and the particle region). When the substrate is flat, the resin region can also be formed by using photolithography. The method for curing a linear region in the film (between the particle region and the particle region) for the optical apparatus according to an embodiment of the present disclosure may be a method in which the material is left to stand at room temperature, a method in which curing is facilitated by any heating process, or a method in which ultraviolet rays are applied. In the method for performing curing through a heating process, for example, a heating furnace, a heater, or infrared heating may be employed. The curing temperature is preferably room temperature to 400° C. and more preferably room temperature to 200° C.

EXAMPLES

Hereafter, suitable examples in the present disclosure will be described.

The evaluation of the characteristics of films and the formation of films in Examples 14 to 27 were performed by the following methods.

Evaluation of Water Resistance of Heat-Shielding Film

Test and Evaluation of Water Resistance

A film according to this embodiment was formed on a metal plate having a size of 30 mm×30 mm and a thickness of 1 mm to prepare a sample for measuring water resistance. The metal plate was formed of a stainless steel, aluminum, titanium, or a magnesium alloy. A coating material was applied onto a metal plate formed of a magnesium alloy by using a spin coater and inkjet coating so as to have a thickness of 65 µm and fired to form a film.

The heat-shielding film according to this embodiment was inserted into a thermostat oven at high temperature and high humidity (temperature: 70° C., humidity: 90%) for 100 hours to investigate the water resistance.

The water resistance was evaluated in conformity with JIS K5600-5-4 (scratch hardness (pencil method)) by comparing the results before and after the water resistance test. An evaluation result of "A" was given when the hardness did not change before and after the water resistance test. An evaluation result of "B" was given when the hardness decreased after the water resistance test.

Evaluation of Solar Reflectance

The solar reflectance was determined by using the same instrument and method as those in the first embodiment.

A film was formed on a metal plate having a size of 30 mm×30 mm and a thickness of 1 mm to prepare a sample for measurement. The metal plate was formed of a stainless steel, aluminum, titanium, or a magnesium alloy. A coating material was applied onto a metal plate formed of a magnesium alloy by using a spin coater and inkjet coating so as to have a thickness of 65 µm and fired to form a film.

At a solar reflectance of 70% or more, the film is an excellent film because the temperature-decreasing effect is high. At a solar reflectance of 60% or more and less than 70%, the film is a good film because the temperature-decreasing effect is relatively high. At a solar reflectance of less than 60%, the film is a poor film because the temperature-decreasing effect is reduced.

Three-Grade Evaluation A to C

A: Solar reflectance is 70% or more.
B: Solar reflectance is 60% or more and less than 70%.
C: Solar reflectance is less than 60%.

Heat-Shielding Effect

The heat-shielding effect was also determined by using the same instrument and method as those in the first embodiment.

Example 14

Preparation of Coating Material

In Example 14, a coating material was prepared by the following method. That is, 15 g of titanium oxide (20 vol % in terms of coating film), 13 g of a resin (57.5 vol % in terms of coating film), 0.75 g of silica (1.8 vol % in terms of coating film), 1 g of a pigment (3.5 vol % in terms of coating film), 3.9 g of a curing agent (17.2 vol % in terms of coating film), and 3 g of a thinner were weighed and stirred using a planetary mixer (AR-100, THINKY Corporation) for 10 minutes to prepare a coating material T1 in Example 14. The titanium oxide used was D-970 (SAKAI CHEMICAL INDUSTRY Co., Ltd., average particle size 0.26 µm, silica-coated surface). The resin used was an Olester Q-691 (Mitsui Chemicals, Inc.).

The silica particles used were an AEROSIL R-972 (NIPPON AEROSIL Co., Ltd., average particle size 100 nm). The pigment used was a CHROMOFINE BLACK A1103 (Dainichiseika Color & Chemicals Mfg. Co., Ltd.). The curing agent used was a Takenate D-120N (Mitsui Chemicals, Inc.).

A coating material T2 for forming the resin region 123 in Example 14 was prepared by weighing 0.75 g of silica, 13 g of a resin, 3.9 g of a curing agent, and 20 g of a thinner and stirring the mixture using a planetary mixer (AR-100, THINKY Corporation) for 10 minutes. The resin used was an Olester Q-691 (Mitsui Chemicals, Inc.). The silica used was an AEROSIL R-972 (NIPPON AEROSIL Co., Ltd., average particle size 100 nm). The curing agent used was a Takenate D-120N (Mitsui Chemicals, Inc.).

Formation of Heat-Shielding Film

In Example 14, two samples on which the film was formed were prepared by the following method.

First, the coating material T1 was applied onto a metal plate formed of a magnesium alloy using a spin coater so as to have a thickness of 20 μm, dried at room temperature for one night, and then fired at 130° C. for 30 minutes to form a film M1. Then, the coating material T2 was applied onto a surface of the film M1 by pad printing so as to have a pattern with a size of 10 μm×8 μm and a thickness of 1.5 μm. Subsequently, drying was performed at room temperature for one night and then firing was performed at 130° C. for 30 minutes to form a resin region 123. Subsequently, the coating material T1 was applied using a spin coater so as to have a thickness of 45 μm, dried at room temperature for one night, and then fired at 130° C. for 30 minutes to obtain two samples in Example 14. A cross-section of one of the two samples was cut out and observed. The area proportion of the resin region 123 relative to the whole area of the film cross-section was 0.15 area %.

Examples 15 to 27

In Examples 15 to 27, coating materials and samples on which the film was formed were prepared in the same manner as in Example 14, except that materials and conditions listed in Table 7 were used.

Comparative Examples 3 to 12

In Comparative Examples 3 to 12, coating materials and samples on which the film was formed were prepared in the same manner as in Example 14, except that materials and conditions listed in Table 7 were used.

For the films, the change in scratch hardness after the water resistance test, the solar reflectance after the water resistance test, and the temperature-decreasing effect before and after the lightfastness test were evaluated in the same manner as in Examples 14 to 27.

TABLE 7

| | Particle | | | Resin region | | | | |
|---|---|---|---|---|---|---|---|---|
| | vol % | Material | Average particle size (μm) | Resin material | Width D (μm) | Width E (μm) | Resin region Sectional area proportion (%) | Thickness (μm) |
| Example 14 | 20 | TiO$_2$ | 0.28 | urethane-acrylic | 1.5 | 10 | 0.15 | 65 |
| Example 15 | 10 | TiO$_2$ | 0.26 | urethane-acrylic | 1.5 | 10 | 0.15 | 65 |
| Example 16 | 60 | TiO$_2$ | 0.26 | urethane-acrylic | 1.5 | 10 | 0.15 | 65 |
| Example 17 | 35 | TiO$_2$ | 0.26 | urethane-acrylic | 0.2 | 10 | 0.07 | 65 |
| Example 18 | 35 | TiO$_2$ | 0.26 | urethane-acrylic | 2 | 10 | 0.75 | 65 |
| Example 19 | 35 | TiO$_2$ | 0.26 | urethane-acrylic | 1.5 | 3 | 0.15 | 65 |
| Example 20 | 35 | TiO$_2$ | 0.26 | urethane-acrylic | 1.5 | 100 | 0.15 | 65 |
| Example 21 | 35 | TiO$_2$ | 0.26 | urethane-acrylic | 1.5 | 10 | 0.05 | 65 |
| Example 22 | 35 | TiO$_2$ | 0.26 | urethane-acrylic | 1.5 | 10 | 13 | 65 |
| Example 23 | 35 | TiO$_2$ | 0.11 | urethane-acrylic | 1.5 | 10 | 0.15 | 65 |
| Example 24 | 35 | TiO$_2$ | 0.4 | urethane-acrylic | 1.5 | 10 | 0.15 | 65 |
| Example 25 | 35 | TiO$_2$ | 0.26 | urethane-acrylic | 1.5 | 10 | 0.15 | 10 |
| Example 26 | 35 | TiO$_2$ | 0.26 | urethane-acrylic | 1.5 | 10 | 0.15 | 70 |
| Example 27 | 35 | TiO$_2$ | 0.26 | urethane-acrylic | 1.5 | 10 | 0.15 | 65 |
| Comparative Example 3 | 35 | TiO$_2$ | 0.26 | urethane-acrylic | 0.1 | 10 | 0.15 | 65 |
| Comparative Example 4 | 35 | TiO$_2$ | 0.26 | urethane-acrylic | 5 | 10 | 0.15 | 65 |
| Comparative Example 5 | 35 | TiO$_2$ | 0.26 | urethane-acrylic | 1.5 | 1 | 0.15 | 65 |
| Comparative Example 6 | 35 | TiO$_2$ | 0.26 | urethane-acrylic | 1.5 | 120 | 0.15 | 65 |
| Comparative Example 7 | 35 | TiO$_2$ | 0.26 | urethane-acrylic | 1.5 | 10 | 0.02 | 65 |
| Comparative Example 8 | 35 | TiO$_2$ | 0.26 | urethane-acrylic | 1.5 | 10 | 15 | 65 |
| Comparative Example 9 | 35 | TiO$_2$ | 0.08 | urethane-acrylic | 1.5 | 10 | 0.15 | 65 |
| Comparative Example 10 | 35 | TiO$_2$ | 0.44 | urethane-acrylic | 1.5 | 10 | 0.15 | 65 |
| Comparative Example 11 | 35 | TiO$_2$ | 0.26 | urethane-acrylic | 1.5 | 10 | 0.15 | 10 |
| Comparative Example 12 | 35 | TiO$_2$ | 0.26 | urethane-acrylic | 1.5 | 10 | 0.15 | 90 |

Evaluation Result

Table 8 shows the change in scratch hardness after the water resistance test, the solar reflectance after the water resistance test, the temperature-decreasing effect before and after the lightfastness test, and the optical precision evaluated for the films in Examples 14 to 27 and Comparative Examples 3 to 12 by the above-described methods. For the optical precision, an evaluation result of "A" was given when the axis shift was tolerable and an evaluation result of "B" was given when the axis shift was not tolerable.

TABLE 8

|  | Before water resistance test Scratch hardness | After water resistance test Scratch hardness | Heat-shielding properties Solar reflectance (%) | Evaluation result of water resistance | Heat-shielding properties | Optical precision |
|---|---|---|---|---|---|---|
| Example 14 | 4H | 4H | 73.6 | A | A | A |
| Example 15 | 3H | 3H | 65.1 | A | B | A |
| Example 16 | 5H | 5H | 80.2 | A | A | A |
| Example 17 | 4H | 4H | 73.4 | A | A | A |
| Example 18 | 4H | 4H | 72.9 | A | A | A |
| Example 19 | 4H | 4H | 73 | A | A | A |
| Example 20 | 4H | 4H | 74.1 | A | A | A |
| Example 21 | 4H | 4H | 70.8 | A | A | A |
| Example 22 | 4H | 4H | 75.2 | A | A | A |
| Example 23 | 4H | 4H | 72.2 | A | A | A |
| Example 24 | 4H | 4H | 74.5 | A | A | A |
| Example 25 | 4H | 4H | 63.1 | A | B | A |
| Example 26 | 4H | 4H | 81.7 | A | A | A |
| Example 27 | 4H | 4H | 71.2 | A | A | A |
| Comparative Example 3 | 4H | 3H | 71.3 | B | A | A |
| Comparative Example 4 | 4H | 4H | 59 | A | C | A |
| Comparative Example 5 | 4H | 3H | 72.1 | B | A | A |
| Comparative Example 6 | 4H | 3H | 73 | B | A | A |
| Comparative Example 7 | 4H | 3H | 71.8 | B | A | A |
| Comparative Example 8 | 3H | 2H | 57.8 | B | C | A |
| Comparative Example 9 | 4H | 3H | 66.3 | B | B | A |
| Comparative Example 10 | 4H | 3H | 75.1 | B | A | A |
| Comparative Example 11 | 3H | 2H | 55 | B | C | A |
| Comparative Example 12 | 4H | 4H | 85.6 | A | A | B |

Third Embodiment

In this embodiment, an article including a single-layer film that satisfies both design and heat-shielding properties will be described. The same description as that in the first embodiment may be omitted.

Method for Satisfying Design and Heat-Shielding Properties
Method for Ensuring Design of Appearance Color In general, to ensure the design of an appearance color of an article such as a lens barrel, for example, a film having a desired color adjusted by a coloring agent is formed on a substrate. However, if the film has a dark tone, the film needs to contain a large amount of dark coloring agent. If the film contains a large amount of dark coloring agent, a large amount of visible light is absorbed, which increases the temperature through solar light and deteriorates the heat-shielding properties. In this embodiment, an organic pigment is used as the dark coloring agent, and the organic pigment is distributed in a larger amount on the air interface side than on the substrate side of the film. Consequently, a film having a desired color can be obtained even if the content of the organic pigment is decreased. To distribute the organic pigment in a larger amount on the air interface side than on the substrate side of the film, only the organic pigment contained in the film is intentionally aggregated. It has been found that by segregating only the aggregated organic pigment on the air interface side of the film through convection during formation of the film, the color can be adjusted to a desired color even if the content of a dark color component is low. To achieve this, a coating material containing at least a resin, an organic pigment, an inorganic pigment, and a dispersant is applied onto a substrate to form a film. The dispersant used is a dispersant capable of aggregating the organic pigment rather than inorganic pigments. For example, an alkylol ammonium salt is used as the dispersant. Thus, only the organic pigment can be aggregated, and the organic pigment can be segregated on the air interface side.

Method for Ensuring Heat-Shielding Properties

Figure 1:
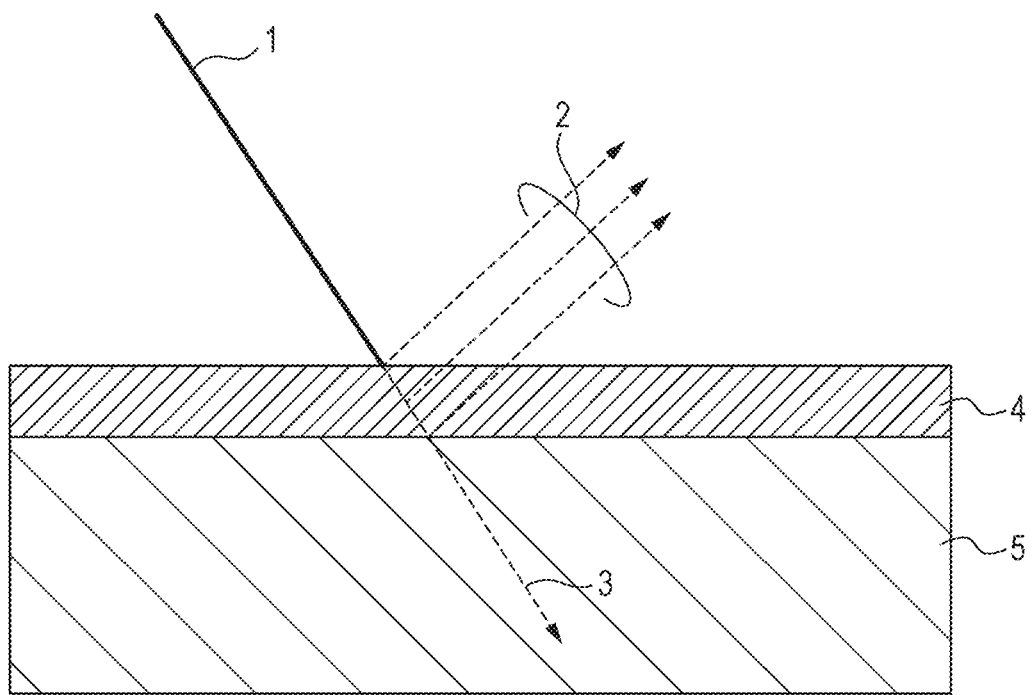
FIG. 1 is a schematic sectional view illustrating reflection and absorption of solar light when a film to be disposed on a surface of an optical apparatus is disposed on an upper surface of a substrate.

To ensure the heat-shielding properties of an article such as a lens barrel, infrared rays in solar light need to be reflected. FIG. 1 is a schematic sectional view illustrating reflection and absorption of solar light on the film according to this embodiment. FIG. 1 illustrates incident light 1, reflected light 2, transmitted light 3, a film 4, and a substrate 5. The wavelength of the solar light is in the range of about 0.3 μm to about 3 μm. When light having such a wavelength becomes transmitted light 3 as illustrated in FIG. 1, the energy is converted into thermal energy and thus the substrate 5 generates heat. Therefore, to suppress the generation of heat due to solar light without using a heat-insulating layer, the generation of heat due to light transmission to the inside needs to be suppressed by increasing the ratio of the reflected light 2 to the incident light 1 as much as possible.

The wavelength range of 0.3 μm to 3 μm of solar light is a Mie scattering region for particles having a particle size of several micrometers. On the basis of the calculation of Mie scattering, the highest reflectance of solar light is achieved at a particle size of about 1 µm. Therefore, the particle size of solar light-reflecting particles is generally about 1 µm.

To more efficiently reflect infrared rays by the solar light-reflecting particles, it is desired that the reflecting particles are uniformly dispersed in the film 4. Nonuniform dispersion of the reflecting particles deteriorates the temperature rise-reducing effect.

The solar light-reflecting particles are, for example, colored inorganic pigment particles such as white titania particles. By uniformly dispersing inorganic pigment particles in the film, infrared reflection can be sufficiently achieved.

Method for Satisfying Both Design and Heat-Shielding Properties

In this embodiment, the design of an appearance color and the heat-shielding properties of a lens barrel are ensured by the following method. The design is ensured by adjusting the color to a desired color only on the surface of the film through segregation of the organic pigment to the air interface side. Furthermore, by uniformly dispersing titania particles or infrared reflective colored inorganic pigment particles in an inner portion (from a central portion toward an interface with the substrate) other than the surface portion of the film, infrared rays are efficiently reflected and thus the heat-shielding properties are ensured.

Figure 8:
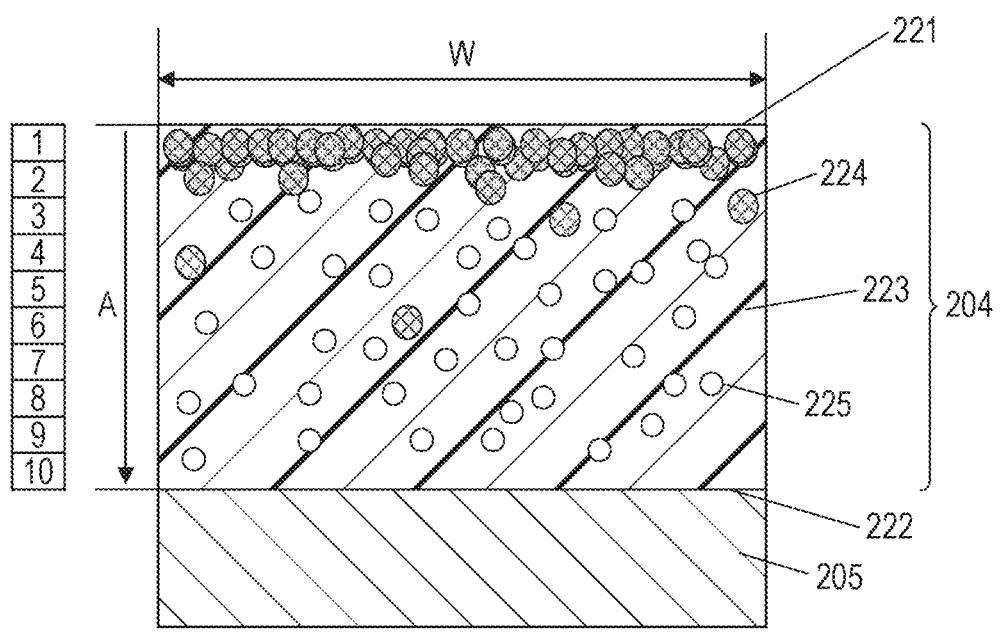
FIG. 8 is a schematic sectional view illustrating a film according to a third embodiment.

FIG. 8 is a schematic sectional view illustrating the film according to this embodiment. The cross-section of the film illustrated in FIG. 8 is a cross-section that has a width W and extends from an air interface 221 to a substrate 205 in a thickness direction (A direction), the cross-section being cut out from an article on which the film is formed in a direction parallel to the direction normal to the film surface. FIG. 8 illustrates an air interface 221 of a film 204, a substrate interface 222 of the film 204, a resin 223, an organic pigment 224, and an inorganic pigment 225. In this embodiment, 221 denotes an air interface because the surface of the film 204 is in contact with air. However, even if another film is formed on the film 204, the interface between the film 204 and the other film is referred to as an air interface in this embodiment. When the resin region described in the second embodiment is formed in the film, a cross-section is cut out from the air interface 21 to the resin region in the thickness direction (A direction). As illustrated in FIG. 8, the cross-section is divided into 10 sections in the thickness direction A (air interface side: 1 and substrate side: 10). It has been found that, assuming that the content of the organic pigment is 100 area % in this cross-section, when 70 area % or more and 95 area % or less of the organic pigment is distributed in the sections 1 to 3 in the thickness direction, both the design and the heat-shielding properties can be satisfied. In other words, it has been found that both of them can be satisfied when 70 area % or more and 95 area % or less of the organic pigment is contained in a region that is 30% of the cross-section cut out from the air interface of the film toward the substrate interface in the thickness direction. In this embodiment, the content of the organic pigment 224 is measured by the following method. First, cross-sections of the film are cut out at five positions. Each of the cross-sections of the film is cut out in a direction parallel to the direction normal to the film surface so as to have a width W (e.g., 1 µm). The direction normal to the film surface refers to, when the film surface has projections and depressions, a direction normal to a surface obtained by connecting the projections. The cross-sections at the five positions are magnified by 100,000 times by transmission electron microscopy (TEM). Then, the particles are subjected to area analysis at the five positions by energy dispersive X-ray spectroscopy (EDS) to calculate the content per unit area.

Finally, the content of the organic pigment 224 in the film 204 according to an embodiment of the present disclosure is calculated from the average of the contents at the five positions. In this embodiment, the content calculated by this method is expressed in units of area %.

That is, for example, when the cut cross-section is assumed to be 100 area %, 0.1 area % or more and 2.0 area % or less of the organic pigment is contained in the film 204. In this case, when 70 area % or more and 95 area % or less of the organic pigment 224 is contained in the sections 1 to 3 from the air interface of the film 204, both the design and the heat-shielding properties can be satisfied. The sections 1 to 3 from the air interface of the film 204 refer to, when the length from the air interface to the substrate of the film 204 is assumed to be 100%, a region extending from the air interface toward the substrate by 30% of the length. At less than 70 area %, a larger amount of organic pigment 224 needs to be added to ensure the design of an appearance color, which deteriorates the heat-shielding properties. At more than 95 area %, an interface is formed in the sections 1 to 3 from the air interface of the film (i.e., 30% from the air interface in the thickness direction), and infrared rays enter the film through undesired interfacial reflection, which inhibits the temperature rise-reducing effect. The sections 1 to 3 from the air interface of the film refer to, when the length from the air interface to the substrate of the cut cross-section of the film is assumed to be 100%, a region from the air interface of the film to a line that is positioned at 30% of the length and is parallel to the substrate. In this embodiment, the length from the air interface to the substrate refers to a length from an interface of the film on the air interface side to the substrate or a length from the interface on the air interface side to the resin region. When the cut cross-section of the film has projections and depressions on the air interface side, a line that extends along the most depressed portions (portions in which the length from the air interface of the cut cross-section of the film to the substrate (or the resin region) is smallest) and is parallel to the substrate is defined as an interface of the film on the air interface side.

Coating Material According to this Embodiment

Hereafter, materials for the coating material according to this embodiment and a method for producing the coating material according to an embodiment of the present disclosure will be described.

Material

The coating material according to this embodiment contains at least a resin, an organic pigment, an inorganic pigment, and a dispersant.

Resin Component

A resin contained in the coating material according to this embodiment will be described.

Examples of the resin according to this embodiment include epoxy resin, urethane resin, acrylic resin, urethane-acrylic resin, phenolic resin, and alkyd resin. These resins may be used alone or in combination of two or more.

When the total amount of the coating material is assumed to be 100 wt %, the content of the resin in the coating material according to this embodiment is preferably 5 wt % or more and 80 wt % or less and more preferably 15 wt % or more and 50 wt % or less. If the content of the resin in the coating material according to this embodiment is less than 5 wt %, the adhesiveness to the substrate or the toughness of the film may deteriorate. If the content of the resin in the coating material according to this embodiment is more than 50 wt %, the solar reflectance may deteriorate. The coating material is mainly constituted by a solvent component volatilized during formation of the coating film and a resin component and a pigment left in the coating film. Therefore, the content of the resin component or the pigment in the coating material is determined as a solid content after the coating material is dried and fired under particular conditions.

Organic Pigment

The organic pigment contained in the coating material according to this embodiment is an organic azo-based pigment or an organic perylene-based pigment.

The organic azo-based particles may be any particles as long as the organic azo-based particles are particles of a compound having an azo group. Examples of the color of the organic azo-based particles according to this embodiment include black-based colors, yellow-based colors, red-based colors, and orange-based colors. A black-based color can be employed because the change in tinge ($a^*$ and $b^*$) is small when fading is caused by solar light. The solar reflectance can be set to be high, and a material having a solar reflectance of more than 10% achieved by only organic azo-based particles can be selected. Examples of the organic azo-based particles include particles of nickel azo pigments, insoluble azo pigments, soluble azo pigments, high-molecular-weight azo pigments, and azomethine azo pigments. These organic azo-based particles may be used alone or in combination of two or more.

The average particle size of the organic pigment according to this embodiment is preferably 0.1 μm or more and 5.0 μm or less and more preferably 0.1 μm or more and 2.0 μm or less. If the average particle size of the organic pigment according to this embodiment is less than 0.1 μm, the surface area of the particles increases. Consequently, the light resistance deteriorates, which may cause discoloration. If the average particle size of the organic pigment according to this embodiment is more than 5.0 μm, the degree of irregularities of a coating film increases and the thickness precision deteriorates. Consequently, when this embodiment is applied to a lens barrel, the precision of focusing and the like may deteriorate.

The average particle size in this embodiment is an average of the particle sizes of a plurality of resin particles. The average particle size of resin particles is determined by dispersing the particles in water and performing analysis by a laser scattering method. In this embodiment, the average particle size of resin particles is a volume-average particle size.

The average particle size of the organic pigment according to this embodiment can be set to be larger than that of the inorganic pigment described later in order to readily cause segregation to the air interface side due to aggregation of the organic pigment.

The organic pigment may be particles having any shape. Examples of the shape include a globular shape, a cubic shape, an elliptical shape, a plate shape, a layered shape, a chain shape, a hollow shape, a star shape, a needle shape, and an odd shape. In particular, for example, a plate shape, a layered shape, and a chain shape that readily causes segregation to the air interface side due to aggregation of the organic pigment can be employed.

These organic pigments may be used alone or in combination of two or more as long as the design and the heat-shielding properties are not impaired.

When the total amount of the coating material is assumed to be 100 wt %, the content of the organic pigment in the coating material according to this embodiment is preferably 0.01 wt % or more and 1.0 wt % or less and more preferably 0.015 wt % or more and 0.5 wt % or less. If the content of the organic pigment is less than 0.01 wt %, the brightness of the film excessively increases, which may deteriorate the design and may also deteriorate the antifouling properties. If the content of the organic pigment is 1.0 wt % or more, the brightness of the film excessively decreases, which deteriorates the heat-shielding properties.

Inorganic Pigment

The inorganic pigment used in this embodiment may be any inorganic pigment as long as the inorganic pigment has good heat-shielding properties, and can contain titania particles whose surfaces are coated with silica. In particular, the inorganic pigment further contains a colored inorganic pigment for adjusting the color. The inorganic pigment may contain Ti- and O-containing particles whose surfaces are not coated. The Ti- and O-containing particles whose surfaces are not coated may be the colored inorganic pigment. In this embodiment, the Ti- and O-containing particles whose surfaces are not coated may be simply referred to as Ti- and O-containing particles.

Since titania itself has a high refractive index, the refractive index of the film is easily adjusted to a desired refractive index. The tinge of the coating film is also easily adjusted to a desired tinge because of the bright color of titania itself. Furthermore, a large number of titania products of sufficiently fine particles are commercially available at a relatively low cost and thus titania can be suitably used.

The content of the titania particles whose surfaces are coated with silica in the film according to this embodiment is preferably 10 wt % or more and 70 wt % or less and more preferably 2.0 wt % or more and 60 wt % or less relative to the resin composition. If the content is less than 10 wt %, the infrared reflection effect sometimes cannot be sufficiently produced. If the content is more than 70 wt %, a sufficient film quality is sometimes not achieved. When particles whose surfaces are coated with silica are used, the photocatalytic activity can be suppressed, which can suppress the deterioration of the surrounding resin.

The average particle size of the titania particles whose surfaces are coated with silica according to this embodiment is preferably 0.1 μm or more and 1.5 μm or less and more preferably 0.1 μm or more and 1.0 μm or less. If the average particle size is less than 0.1 μm, the surface area of the particles increases and the titania particles whose surfaces are coated with silica are easily subjected to aggregation, which makes it difficult to suitably disperse the titania particles in the film. Although specifically described later, if the average particle size is more than 1.5 μm, the segregation of the organic pigment to the air interface side is inhibited, and the design and the heat-shielding properties cannot be sufficiently achieved. The titania particles whose surfaces are coated with silica according to this embodiment are defined as particles in which at least part of the surfaces is coated with silica. The average particle size of the titania particles whose surfaces are coated with silica according to this embodiment indicates an equivalent spherical diameter of particles not subjected to aggregation.

The titania particles whose surfaces are coated with silica according to this embodiment can be produced by a publicly known method such as a gas phase method or a liquid phase method as long as a desired refractive index and a desired average particle size are satisfied. Examples of the method include a method in which a metal powder is charged into a flame and burned in an atmosphere containing at least oxygen to synthesize titanium dioxide fine particles and a sol-gel method in which titanium alkoxide is subjected to hydrolysis and polycondensation in the presence of a catalyst. Titania is known to have a crystalline structure such as a rutile structure or an anatase structure, which exhibits a higher refractive index than an amorphous structure. However, titania having any crystalline form can be suitably used as long as a desired particle size is satisfied.

The inorganic pigment according to this embodiment may contain a colored inorganic pigment in addition to the titania particles whose surfaces are coated with silica. The content of the infrared reflective colored inorganic pigment according to this embodiment is preferably 0.01 wt % or more and 2.0 wt % or less and more preferably 0.02 wt % or more and 1.5 wt % or less. If the content of the infrared reflective colored inorganic pigment according to this embodiment is less than 0.01 wt %, the photocatalysis during irradiation with solar light is low, which may considerably change the tinge of the external appearance of the film according to this embodiment. If the content of the infrared reflective colored inorganic pigment according to this embodiment is more than 2.0 wt %, the heat-shielding properties may deteriorate. The infrared reflective colored inorganic pigment according to this embodiment can be uniformly dispersed in the film.

The inorganic pigment according to this embodiment may farther contain Ti- and O-containing particles whose surfaces are not coated. The Ti- and O-containing particles are hardly coated with or are not coated with silica or the like having light resistance because the molecular chain of a resin needs to be cleaved by photocatalysis. This is because the brightness of the film is intended to be decreased during irradiation with solar light by using photocatalysis of the Ti- and O-containing particles whose surfaces are not coated. The reason for this is described below. The organic azo-based particles serving as an organic pigment are a colored pigment having a chemical structure of an azo group R—N=N—R' in a molecule. The organic azo-based particles have a higher infrared reflectivity than inorganic pigments. However, when the organic azo-based particles are irradiated with solar light, the azo group is cleaved into 2R and $N_2$. The organic azo-based particles exhibit a color by N=N contained therein and the surrounding atomic arrangement. Therefore, if N=N is cleaved, the color disappears, which increases the brightness. That is, the color of the film formed on the surface of the article such as an optical apparatus may considerably change. This change remarkably appears as the content of the organic azo-based particles decreases.

$TiO_2$ in the Ti- and O-containing particles 10 is excited by photocatalysis due to solar light and excited Ti- and O-containing particles are formed. The Ti- and O-containing particles excited by solar light release electrons ($e^-$) into the resin, and the molecular chain of the resin is cleaved by electron energy. As a result, the resin becomes a discolored resin and thus the brightness decreases.

In the film according to an embodiment of the present disclosure, the brightness of the organic azo-based particles increases as a result of the irradiation with solar light while the brightness of the Ti- and O-containing particles decreases. On the whole, the discoloration is suppressed by the cancellation effect. The Ti- and O-containing particles include particles containing only Ti and O (e.g., titanic particles) and/or particles containing at least one inorganic metal in addition to Ti and O. Examples of the particles containing at least one inorganic metal in addition to Ti and O according to this embodiment include (Ti,Ni,Sb)Ox, (Ti,Cr,Sb)Ox, (Ti,Fe,Zn)Ox, (Co,Cr,Zn,Al,Ti)Ox, (Co,Cr,Zn,Ti)Ox, and (Co,Al,Ni,Ti)Ox. Examples of the Ti- and O-containing particles according to an embodiment of the present disclosure include (Ti,Ni,Sb)Ox, (Ti,Cr,Sb)Ox, (Ti,Fe,Zn)Ox, (Co,Cr,Zn,Al,Ti)Ox, (Co,Cr,Zn,Ti)Ox, and (Co,Al,Ni,Ti)Ox. When the Ti- and O-containing particles are contained, the content can be set to 1.6 wt % or less.

Silica Particle

In this embodiment, silica particles may be further contained. The average particle size of the silica particles can be set to 10 nm or more and 110 nm or less. When the average particle size is in the range of 10 nm or more and 110 nm or less, minute defects of silica that coats the surfaces of the titania particles can be filled, which suppresses the discoloration in an oxygen-free atmosphere. If the average particle size of the silica particles according to this embodiment is less than 10 nm, the minute defects of silica that coats the surfaces of the titanium oxide particles are not easily filled, which may make it difficult to suppress the discoloration in an oxygen-free atmosphere. If the average particle size of the silica particles contained in the coating material according to an embodiment of the present disclosure is more than 110 nm, the absorbability to titanium oxide deteriorates, which may make it difficult to suppress the discoloration in an oxygen-free atmosphere.

The silica particles may have any shape. Example of the shape of the silica particles include a globular shape, an indefinite shape, a star shape, a chain shape, a hollow shape, and a porous shape. These silica particles may be used alone or in combination of two or more.

The particle size of silica particles 128 according to this embodiment is a number-average particle size. Before the coating material is applied, the average particle size of the silica particles 128 can be measured by a dynamic light scattering method. When the average particle size is measured after formation of a film, samples having a thickness of 300 nm and a size of 5 µm×5 µm are cut out from the film according to this embodiment at five positions and magnified by 100,000 times by transmission electron microscopy (TEM). Then, the silica particles 128 are subjected to area analysis at the five positions by energy dispersive X-ray spectroscopy (EDS) to determine the particle sizes of the silica particles 128 and calculate the average of the particle sizes. Finally, the average of the particle sizes at the five positions is determined. The average of the particle sizes at the five positions is defined as an average particle size of the silica particles contained in the film according to this embodiment. In this embodiment, for example, when silica particles 128 having a particle size of 10 nm or more and 50 nm or less are aggregated to form secondary particles as illustrated in FIG. 7C, the application property can be improved when the length of the secondary particles in a long-side direction is 50 nm or more and 350 nm or less. In particular, branched silica particles constituted by chains of silica particles 128 having a globular shape can be selected. When the coating material for forming a light-shielding film is applied, the branched silica particles constituted by chains of silica particles 128 having a globular shape are suitable because the space formed by the silica particles 128 increases and thus particles 127 can readily move.

The content of the silica particles is 0.6 mass % or more and 14 mass % or less and is preferably 1 mass % or more and 10 mass % or less relative to the nonvolatile components in the coating material. If the content of the silica particles is less than 0.6 mass %, minute defects of silica that coats the titanium oxide particles cannot be completely filled, which may further cause discoloration in an oxygen-free atmosphere. If the content of the silica particles according to an embodiment of the present disclosure is more than 14 mass %, the haze of a coating film deteriorates, which may deteriorate the reflectance. The content of the silica particles relative to the nonvolatile components in the coating material can be determined by the same method as the content of the silica particles in the film according to an embodiment of the present disclosure after the coating material is cured. The method will be described later.

Dispersant

A dispersant contained in the coating material according to this embodiment may be any dispersant as long as the dispersant can aggregate organic pigments rather than inorganic pigments. In particular, the dispersant contains an alkylol ammonium salt. Originally, a dispersant adsorbs onto the surfaces of pigment particles to keep a constant distance between the pigment particles away from each other, thereby preventing the aggregation between the pigment particles. However, the dispersant in this embodiment aggregates organic pigments and disperses inorganic pigments.

The dispersant according to an embodiment of the present disclosure may include at least an acid radical. The dispersant according to an embodiment of the present disclosure may have an acid value (mgKOH/g) of 30 or more and 100 or less. At an acid value (mgKOH/g) of 30 or more and 100 or less, the organic pigment can be more appropriately precipitated on the air interface side. The amount of the dispersant added may be larger than that of the organic pigment. If the amount of the dispersant added is smaller than that of the organic pigment, the organic pigment is partly dispersed, which decreases the amount of the organic pigment segregated on the air interface side.

The content of the dispersant according to an embodiment of the present disclosure is preferably 0.1 wt % or more and 10.0 wt % or less and more preferably 0.15 wt % or more and 7.0 wt % or less. If the content of the dispersant is less than 0.1 wt %, the heat-shielding properties deteriorate. If the content of the dispersant is 10.0 wt % or more, the refractive index of the film decreases, which reduces the reflection due to the difference in refractive index.

Solvent

A solvent contained in the coating material will be described.

Any solvent may be used. Examples of the solvent include water, thinner, ethanol, isopropyl alcohol, n-butyl alcohol, ethyl acetate, propyl acetate, isobutyl acetate, butyl acetate, and methyl ethyl ketone. Other examples of the solvent include methyl isobutyl ketone, propylene glycol monomethyl ether, toluene, xylene, acetone, cellosolves, glycol ethers, and ethers. These solvents may be used alone or in combination of two or more.

The viscosity of the coating material according to an embodiment of the present disclosure is preferably 10 mPa·s or more and 10000 mPa·s or less and more preferably 20 mPa·s or more and 1000 mPa·s or less. If the viscosity of the coating material is less than 10 mPa·s, the thickness of a coated heat-shielding film may decrease in some places. If the viscosity of the coating material is more than 10000 mPa·s, the application property of the coating material may deteriorate.

Other Additives

The coating material used for the optical apparatus according to this embodiment may contain any other additives. Examples of the additives include curing agents, curing catalysts, plasticizers, thixotropy-imparting agents, leveling agents, matting agents, preservatives, ultraviolet absorbers, antioxidants, and coupling agents.

Method for Producing Coating Material

Hereafter, a method for producing a coating material according to this embodiment will be described.

The method for producing a coating material for forming a film on the upper surface of an optical apparatus according to this embodiment may be any method as long as the organic particles and the inorganic pigment according to an embodiment of the present disclosure can be dispersed in the coating material. For example, a bead mill, a ball mill, a jet mill, a three-roll mixer, a planetary mixer, a mixer, an ultrasonic disperser, or a homogenizer can be used.

Film

Hereafter, materials for the film according to this embodiment be described.

The film according to this embodiment contains at east a resin, an organic pigment, and an inorganic pigment.

Material

Resin Component

The content of the resin according to this embodiment is preferably 20 area % or more and 90 area % or less and more preferably 30 area % or more and 80 area % or less. If the content of the resin according to this embodiment is less than 20 area %, the adhesiveness to the substrate may deteriorate. If the content of the resin according to this embodiment is more than 90 area %, the solar reflectance may deteriorate.

Organic Pigment

The content of the organic pigment according to an embodiment of the present disclosure is preferably 0.1 area % or more and 2.0 area % or less and more preferably 0.15 area % or more and 1.5 area % or less. If the content of the organic pigment is less than 0.1 area %, the brightness of the film excessively increases, which may deteriorate the design and may also deteriorate the antifouling properties. If the content of the organic pigment is 2.0 area % or more, the brightness of the film excessively decreases, which may deteriorate the heat-shielding properties.

Inorganic Pigment

The content of the titania particles whose surfaces are coated with silica and which serve as an example of the inorganic pigment used for adjusting the brightness according to this embodiment is preferably 10 area % or more and 80 area % or less and more preferably 20 area % or more and 60 area % or less. If the content of the inorganic pigment for adjusting the brightness according to this embodiment is less than 10 area %, the tinting strength is low, which may make it difficult to adjust the brightness to 50 or more. If the content of the inorganic pigment for adjusting the brightness according to this embodiment is more than 80 area %, the film may become brittle.

The content of the colored inorganic pigment according to this embodiment is preferably 0.1 area % or more and 3.0 area % or less and more preferably 0.2 area % or more and 2.0 area % or less. If the content of the colored inorganic pigment according to this embodiment is less than 0.1 area %, the photocatalysts during irradiation with solar light is low, which may considerably change the tinge of the external appearance of the film. If the content of the colored inorganic pigment is more than 3.0 area %, the heat-shielding properties may deteriorate.

The colored inorganic pigment can be uniformly dispersed in the film.

Other Additives

The coating material used for the optical apparatus according to this embodiment may contain any other additives. Examples of the additives include curing agents, curing catalysts, plasticizers, thixotropy-imparting agents, leveling agents, matting agents, preservatives, ultraviolet absorbers, antioxidants, and coupling agents.

Film Configuration

The film formed on the upper surface of the optical apparatus according to this embodiment is formed on the outer side relative to the substrate. The film may closely adhere to the substrate or a primer layer for improving the adhesiveness may be disposed between the substrate and the film formed on the upper surface of the optical apparatus.

Substrate

The substrate may be formed of any material such as a metal or a plastic. Examples of the metal include aluminum, titanium, stainless steels, magnesium alloys, and lithium-magnesium alloys. Examples of the plastic include polycarbonate resin, acrylic resin, ABS resin, and fluororesin.

The substrate may have any thickness. The thickness is preferably 0.5 mm or more and 5 mm or less and more preferably 0.5 mm or more and 2 mm or less. If the thickness is less than 0.5 mm, it is difficult to maintain the shape of a lens barrel. If the thickness is more than 5 mm, the cost of members increases.

Primer

A primer may be used to improve the adhesiveness between the substrate and the film. In this specification, when the primer is used, the substrate and the primer on the substrate are referred to as a substrate. That is, the substrate includes a primer.

The primer may be formed of any material. Examples of the material include epoxy resin, urethane resin, acrylic resin, silicone resin, and fluororesin. The primer may contain the particles according to this embodiment, particles other than the particles according to this embodiment, a coloring agent, a dispersant, a curing agent, a curing catalyst, a plasticizer, a thixotropy-imparting agent, a leveling agent, an organic coloring agent, an inorganic coloring agent, a preservative, an ultraviolet absorber, an antioxidant, a coupling agent, and a solvent residue.

The thickness of the primer is preferably 2 μm or more and 30 μm or less and more preferably 5 μm or more and 20 μm or less. If the thickness is less than 2 μm, the adhesiveness of the film sometimes decreases. If the thickness is more than 30 μm, the positioning accuracy may be adversely affected.

Thickness of Film According to this Embodiment

The thickness of the film according to this embodiment is preferably 10 μm or more and 100 μm or less and more preferably 20 μm or more and 90 μm or less. If the thickness is less than 10 μm, the solar reflectance may deteriorate. If the thickness is more than 100 μm, the positioning accuracy of the optical apparatus may be adversely affected or the film may be separated or cracked in a hostile environment.

Method for Forming Film According to this Embodiment

The film according to this embodiment can be formed by any coating method and any curing method as long as the coating material according to this embodiment can be uniformly applied so as to have a thickness of 10 μm or more and 100 μm or less.

Examples of the coating method of the heat-shielding film for the optical apparatus according to this embodiment include coating with a brush, spray coating, dip coating, and transfer. The heat-shielding film may be constituted by a single coating layer or a plurality of coating layers, or may be grained to achieve good design.

The curing method of the film for the article or the optical apparatus according to this embodiment may be a method in which the coating material is left to stand at room temperature, a method in which curing is facilitated by any heating process, or a method in which ultraviolet rays are applied. In the method for performing curing through a heating process, for example, a heating furnace, a heater, or infrared heating may be employed. The curing temperature is preferably room temperature to 400° C. and more preferably room temperature to 200° C.

Characteristics of Film

Solar Reflectance

The solar reflectance of the film according to this embodiment can be set to 60% or more. If the solar reflectance is less than 60%, the temperature-decreasing effect deteriorates.

Brightness

The brightness L* of the film according to this embodiment is preferably 60 or more and 90 or less and more preferably 71 or more and 80 or less. If the brightness is less than 60, the temperature rise-reducing effect deteriorates. If the brightness is 90 or more, the film is whitened, which may deteriorate the antifouling properties.

EXAMPLES

Hereafter, suitable examples in this embodiment will be described.

The preparation of a coating material, the formation of a film, and the evaluation of the characteristics of the film in Examples 28 to 37 were performed by the following methods.

Observation of Cross-Section of Film

The cross-section of the film was observed using an optical microscope. Then, the cross-sectional image was processed with image analysis software (Image-Pro Plus manufactured by Media Cybernetics) to evaluate the distribution of the content of an organic pigment in a thickness direction. The cross-section was divided into 10 sections in the thickness direction from the base interface to the air interface to evaluate the distribution of the content of an organic pigment in the thickness direction.

Evaluation of Design

The design was evaluated by measuring the brightness L* using a color difference meter (SE-7700, NIPPON DEN SHOKU INDUSTRIES Co., Ltd.). A coating film was formed on a SUS foil to prepare a sample for measurement. First, a coating material according to an embodiment of the present disclosure was applied onto a SUS foil so as to have a thickness of 50 μm and then cured in a firing furnace. After the formation of the coating film, L* of the film on the air interface side was measured using a color difference meter. Subsequently, the film was peeled off from the SUS foil and then L* of the film on the SUS foil interface side was measured. By comparing the brightness of the coating film on the air interface side and the brightness of the coating film on the base (SUS foil) interface side, the presence or absence of the distribution of the organic pigment to the air interface side in the thickness direction was evaluated.

The case where the difference in brightness (ΔL*) is 0.2 or more and the brightness on the air interface side is lower than the brightness on the base interface side is evaluated as a film A in which a large amount of organic pigment is distributed on the air interface side. The case where the difference in brightness (ΔL*) is 0.2 or more and the brightness on the air interface side is higher than the brightness on the base interface side is evaluated as a film B in which a small amount of organic pigment is distributed on the air interface side. The case where the difference in brightness (ΔL*) is less than 0.2 is evaluated as a film C in which the organic pigment is uniformly distributed in the coating film.

A: Difference in brightness is 0.2 or more and brightness on air interface side<brightness on base interface side B: Difference in brightness is 0.2 or more and brightness on air interface side>brightness on base interface side C: Difference in brightness is less than 0.2

In the present disclosure, the film A has a good design because the tinge of the film A can be adjusted to a desired tinge even if the amount of organic pigment for adjusting the brightness is small compared with the film B and the film C.

Evaluation of Heat-Shielding Properties

The heat-shielding properties were evaluated based on solar reflectance. The solar reflectance was measured and calculated by using the same instrument and method as those in the first embodiment.

A coating film was formed on a SUS foil to prepare a sample for measurement. Specifically, a coating material according to an embodiment of the present disclosure was applied onto a SUS foil so as to have a thickness of 50 μm and cured in a firing furnace to form a coating film.

At a solar reflectance of 70% or more, the film is an excellent film because the temperature-decreasing effect is high. At a solar reflectance of 60% or more and less than 70%, the film is a good film because the temperature-decreasing effect is relatively high. At a solar reflectance of less than 60%, the film is a poor film because the temperature-decreasing effect is reduced.

A: Solar reflectance is 70% or more.
B: Solar reflectance is 60% or more and less than 70%.
C: Solar reflectance is less than 60%.

In the present disclosure, when the evaluation result of the solar reflectance is A or B, good heat-shielding properties are achieved, Evaluation of Durability The durability of the coating film was evaluated by the following method. A film according to an embodiment of the present disclosure was formed on a metal plate having a size of 80 mm×160 mm and a thickness of 1 mm to prepare a sample for measurement. The metal plate was formed of a stainless steel, aluminum, titanium, or a magnesium alloy. First, a coating material according to an embodiment of the present disclosure was applied onto a metal plate so as to have a thickness of 50 μm and cured in an a firing furnace to form a coating film. Subsequently, the sample was repeatedly subjected to thermal shock 100 times in the range of −30° C. to 80° C., and then the external appearance of the coating film was evaluated.

When the external appearance does not substantially change (A), the film is a film having very high durability. When the external appearance or the like slightly changes (B), the film is a film having relatively high durability. When the film is cracked or separated (C), the film is a film having low durability.

A: Film having very high durability
B: Film having relatively high durability
C: Film having low durability In the present disclosure, when the evaluation result of the durability is A or B, the film has no problem in terms of durability.

Example 28

Preparation of Coating Material

In Example 28, a coating material was prepared by the following method. That is, 100 g of a resin (45.9 vol % in terms of coating film), 130 g of an inorganic pigment (titania coated with silica) (29.3 vol % in terms of coating film), and 1.0 g of an organic pigment (0.5 vol % in terms of coating film) were weighed. Furthermore, 4.0 g of a colored inorganic pigment (0.7 vol % in terms of coating film), 5.0 g of a dispersant (4.1 vol % in terms of coating film), and 100 g of a solvent were weighed. They were stirred using a ball mill for 15 hours to obtain a main agent. One gram of a curing agent (18.4 vol %) was mixed with 10 g of the obtained main agent to prepare a coating material in Example 28.

The resin used was an (Nester Q-691 (Mitsui Chemicals, Inc.). The organic pigment used was a CHROMOHNE BLACK A1103 (Dainichiseika Color & Chemicals Mfg. Co., Ltd.). The colored inorganic pigment used was #5950 (Asahi sangyo Kaisha, Ltd.). The dispersant used was a DISPERBYK-180 (BYK Japan KK). The inorganic pigment (titania coated with silica) used was D-970 (SAKAI CHEMICAL INDUSTRY Co., Ltd., average particle size 0.26 μm). The curing agent used was a Takenate D-120N (Mitsui Chemicals, Inc.).

Formation of Film

In Example 28, a film was formed by the following method. The above coating material was applied onto a metal plate formed of a magnesium alloy using a spin coater so as to have a thickness of 50 μm, dried at room temperature for one night, and then fired at 130° C. for 30 minutes to form a film in Example 28. Furthermore, the coating material was applied onto each of a SUS foil and a metal plate using a bar coater so as to have a thickness of 50 μm, dried at room temperature for one night, and then fired at 130° C. for 30 minutes to obtain films in Example 28.

Examples 29 to 37

In Examples 29 to 37, a coating material and a film were prepared in the same manner as in Example 28, except that materials and conditions listed in Tables 9 and 10 were used. The inorganic pigment (titania coated with silica) used in Example 29 was QSC-100 (Denka Company Limited, average particle size 0.11 μm). The inorganic pigment (titania coated with silica) used in Example 30 was R-38L (SAKAI CHEMICAL INDUSTRY Co., Ltd., average particle size 0.4 μm). The organic pigment used in Example 31 was a C.I. Pigment Black 32 (BASF, average particle size 0.2 μm) serving as a perylene pigment. The dispersant used in Example 33 was a DISPERBYK (BYK Japan KK). The dispersant used in Example 34 was an ANTI-TERRA-250 (BYK Japan KK). The dispersant used in Example 35 was a DISPERBYK-187 (BYK Japan KK).

Comparative Examples 13 to 19

In Comparative Examples 13 to 19, a film was formed in the same manner as in Example 28, except that materials and conditions listed in Table 9 were used. The inorganic pigment (titania coated with silica) used in Comparative Example 13 was HT0210 (TOHO TITANIUM Co., Ltd., average particle size 2.25 μm). The inorganic pigment (titania coated with silica) used in Comparative Example 14 was MT-700B (TAYCA Corporation, average particle size 0.08 μm). The dispersant used in Comparative Example 17 was DISPERBYK-145 (BYK Japan KK). The dispersant used in Comparative Example 18 was an ANTI-TERRA-108 (BYK Japan KK). The dispersant used in Comparative Example 19 was a DISPERBYK-2008 (BYK Japan KK). Table 11 shows the materials for the films in Comparative Examples 13 to 16 and the contents of the materials. Table 12 shows the evaluation results of the films in Comparative Examples 17 to 19.

TABLE 9

|  |  |  |  |  | Example 28 | Example 29 | Example 30 | Example 31 | Example 32 |
|---|---|---|---|---|---|---|---|---|---|
| Coating film | Coating material | Main agent | Resin | Material | acrylic-urethane | acrylic-urethane | acrylic-urethane | acrylic-urethane | acrylic-urethane |
|  |  |  |  | Amount added (g) | 100 | 100 | 100 | 100 | 100 |
|  |  |  | Inorganic pigment (titania coated with silica) | Material | titania | titania | titania | titania | titania |
|  |  |  |  | Average particle size (μm) | 0.26 | 0.11 | 0.4 | 0.26 | 0.26 |
|  |  |  |  | Amount added (g) | 130 | 130 | 130 | 130 | 130 |
|  |  |  | Organic pigment | Material | azomethine black | azomethine black | azomethine black | perylene black | perylene black |
|  |  |  |  | Average particle size (μm) | 0.87 | 0.87 | 0.87 | 0.2 | 4.8 |
|  |  |  |  | Amount added (g) | 1 | 1 | 1 | 1 | 1 |
|  |  |  | Colored inorganic pigment | Material | yellow | yellow | brown | brown | yellow |
|  |  |  |  | Amount added (g) | 4 | 4 | 4 | 4 | 4 |
|  |  |  | Organic solvent | Material | thinner | thinner | thinner | thinner | thinner |
|  |  |  |  | Amount added (g) | 100 | 100 | 100 | 100 | 100 |
|  |  |  | Dispersant | Material | alkylol ammonium salt of copolymer having acid radical | alkylol ammonium salt of copolymer having acid radical | alkylol ammonium salt of copolymer having acid radical | alkylol ammonium salt of copolymer having acid radical | alkylol ammonium salt of copolymer having acid radical |
|  |  |  |  | Amount added (g) | 5 | 5 | 5 | 5 | 5 |
|  |  | Curing agent (relative to 10 g of main agent) |  | Material | isocyanate | isocyanate | isocyanate | isocyanate | isocyanate |
|  |  |  |  | Amount added (g) | 1 | 1 | 1 | 1 | 1 |
|  | Content (%) of organic pigment in sections 1 to 3 in thickness direction |  |  |  | 85.5% | 85.1% | 85.3% | 85.5% | 85.1% |

TABLE 10

|  |  |  |  |  | Example 33 | Example 34 | Example 35 | Example 36 | Example 37 |
|---|---|---|---|---|---|---|---|---|---|
| Coating film | Coating material | Main agent | Resin | Material | acrylic-urethane | acrylic-urethane | acrylic-urethane | acrylic-urethane | acrylic-urethane |
|  |  |  |  | Amount added (g) | 100 | 100 | 100 | 100 | 100 |
|  |  |  | Inorganic pigment (titania coated with silica) | Material | titania | titania | titania | titania | titania |
|  |  |  |  | Average particle size (μm) | 0.26 | 0.26 | 0.26 | 0.26 | 0.26 |
|  |  |  |  | Amount added (g) | 130 | 130 | 130 | 130 | 130 |
|  |  |  | Organic pigment | Material | azomethine black | azomethine black | azomethine black | azomethine black | azomethine black |
|  |  |  |  | Average particle size (μm) | 0.87 | 0.87 | 0.87 | 0.87 | 0.87 |
|  |  |  |  | Amount added (g) | 1 | 1 | 1 | 1 | 1 |
|  |  |  | Colored inorganic pigment | Material | yellow | yellow | brown | brown | yellow |
|  |  |  |  | Amount added (g) | 4 | 4 | 4 | 4 | 4 |
|  |  |  | Organic solvent | Material | thinner | thinner | thinner | thinner | thinner |
|  |  |  |  | Amount added (g) | 100 | 100 | 100 | 100 | 100 |
|  |  |  | Dispersant | Material | alkylol ammonium salt of polycarboxylic acid | alkylol ammonium salt of high-molecular-weight acidic polymer | alkylol ammonium salt of polyfunctional polymer | alkylol ammonium salt of copolymer having acid radical | alkylol ammonium salt of copolymer having acid radical |
|  |  |  |  | Amount added (g) | 5 | 5 | 5 | 3 | 7 |

TABLE 10-continued

|  |  | Example 33 | Example 34 | Example 35 | Example 36 | Example 37 |
|---|---|---|---|---|---|---|
| Curing agent (relative to 10 g of main agent) | Material | isocyanate | isocyanate | isocyanate | isocyanate | isocyanate |
|  | Amount added (g) | 1 | 1 | 1 | 1 | 1 |
| Content (%) of organic pigment in sections 1 to 3 in thickness direction |  | 71.2% | 93.3% | 79.9% | 82.3% | 87.1% |

TABLE 11

|  |  |  |  |  | Comparative Example 13 | Comparative Example 14 | Comparative Example 15 | Comparative Example 16 |
|---|---|---|---|---|---|---|---|---|
| Coating film | Coating material | Main agent | Resin | Material | acrylic-urethane | acrylic-urethane | acrylic-urethane | acrylic-urethane |
|  |  |  |  | Amount added (g) | 100 | 100 | 100 | 100 |
|  |  |  | Inorganic pigment (titania coated with silica) | Material | titania | titania | titania | titania |
|  |  |  |  | Average particle size (μm) | 2.25 | 0.08 | 0.26 | 0.26 |
|  |  |  |  | Amount added (g) | 130 | 130 | 130 | 130 |
|  |  |  | Organic pigment | Material | azomethine black | azomethine black | azomethine black | azomethine black |
|  |  |  |  | Average particle size (μm) | 0.87 | 0.87 | 0.09 | 5.11 |
|  |  |  |  | Amount added (g) | 1 | 1 | 1 | 1 |
|  |  |  | Colored inorganic pigment | Material | yellow | yellow | brown | brown |
|  |  |  |  | Amount added (g) | 4 | 4 | 4 | 4 |
|  |  |  | Organic solvent | Material | thinner | thinner | thinner | thinner |
|  |  |  |  | Amount added (g) | 100 | 100 | 100 | 100 |
|  |  |  | Dispersant | Material | alkylol ammonium salt of copolymer having acid radical | alkylol ammonium salt of copolymer having acid radical | alkylol ammonium salt of copolymer having acid radical | alkylol ammonium salt of copolymer having acid radical |
|  |  |  |  | Amount added (g) | 5 | 5 | 5 | 5 |
|  |  | Curing agent (relative to 10 g of main agent) | Material | isocyanate | isocyanate | isocyanate | isocyanate |
|  |  |  |  | Amount added (g) | 1 | 1 | 1 | 1 |
|  | Content (%) of organic pigment in sections 1 to 3 in thickness direction |  |  |  | 40.2% | 95.3% | 69.5% | 36.1% |

TABLE 12

|  |  |  |  |  | Comparative Example 17 | Comparative Example 18 | Comparative Example 19 |
|---|---|---|---|---|---|---|---|
| Coating film | Coating material | Main agent | Resin | Material | acrylic-urethane | acrylic-urethane | acrylic-urethane |
|  |  |  |  | Amount added (g) | 100 | 100 | 100 |
|  |  |  | Inorganic pigment (titania coated with silica) | Material | titania | titania | titania |
|  |  |  |  | Average particle size (μm) | 0.26 | 0.26 | 0.26 |
|  |  |  |  | Amount added (g) | 130 | 130 | 130 |
|  |  |  | Organic pigment | Material | azomethine black | azomethine black | azomethine black |
|  |  |  |  | Average particle size (μm) | 0.87 | 0.87 | 0.87 |

TABLE 12-continued

|  |  | Comparative Example 17 | Comparative Example 18 | Comparative Example 19 |
|---|---|---|---|---|
| Colored inorganic pigment | Amount added (g) | 1 | 1 | 1 |
|  | Material | yellow | yellow | brown |
|  | Amount added (g) | 4 | 4 | 4 |
| Organic solvent | Material | thinner | thinner | thinner |
|  | Amount added (g) | 100 | 100 | 100 |
| Dispersant | Material | phosphate | carboxylate | modified acrylic |
|  | Amount added (g) | 5 | 5 | 5 |
| Curing agent (relative to 10 g of main agent) | Material | isocyanate | isocyanate | isocyanate |
|  | Amount added (g) | 1 | 1 | 1 |
| Content (%) of organic pigment in sections 1 to 3 in thickness direction |  | 83.5% | 68.7% | 21.1% |

Evaluation Result

Table 13 shows the results of the design, heat-shielding properties, and durability evaluated for the films in Examples 28 to 37 and Comparative Examples 13 to 19 by the above methods.

When an evaluation result of "C" is given, the film is judged to be an undesired film formed on the surface of the optical apparatus.

TABLE 13

|  | Design | Heat-shielding properties | Durability |
|---|---|---|---|
| Example 28 | A | B | A |
| Example 29 | A | B | A |
| Example 30 | A | B | A |
| Example 31 | A | B | A |
| Example 32 | A | B | A |
| Example 33 | A | B | B |
| Example 34 | A | A | B |
| Example 35 | A | B | B |
| Example 36 | A | B | A |
| Example 37 | A | A | A |
| Comparative Example 13 | C | C | B |
| Comparative Example 14 | A | A | C |
| Comparative Example 15 | C | C | B |
| Comparative Example 16 | C | C | B |
| Comparative Example 17 | A | B | C |
| Comparative Example 18 | C | C | B |
| Comparative Example 19 | B | C | B |

The film formed on the upper surface of the optical apparatus according to an embodiment of the present disclosure can be used for lens barrels of optical apparatuses such as cameras, camcorders, and broadcasting apparatuses and also camera main bodies, camcorder main bodies, surveillance cameras, and weather cameras that may be used outdoors.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-095572, filed May 17, 2018, No. 2018-192762, filed Oct. 11, 2018, No. 2018-145862, filed Aug. 2, 2018, No. 2018-163774, filed Aug. 31, 2018, and No. 2019-078891, filed Apr. 17, 2019, which are hereby incorporated by reference herein in their entirety.

What is claimed is:

1. An article comprising:
a substrate and a film disposed on the substrate;
wherein the film contains a resin, a titanium oxide particle whose surface is coated with silica,
silica particles,
an organic azo-based particle, and
a particle containing Ti, O, and an inorganic metal other than Ti,
wherein the area of the organic azo-based particle is 100 area % on a cross section of the film and the content of the particle containing Ti, O, and the inorganic metal other than Ti is 25 area % or more and 1000 area % or less on a cross section of the film, and
an average particle size of the silica particles is 10 nm or more and 110 nm or less.

2. The article according to claim 1, having a brightness of 50 or more.

3. The article according to claim 1, wherein the inorganic metal other than Ti is Sb, Cr, Fe, or Zn.

4. The article according to claim 3, wherein the particle containing Ti, O, and the inorganic metal other than Ti is:
a particle of one material selected from the group consisting of (Ti,Sb,Cr)O2 and (Ti,Fe,Zn)O2, or
a particle of a mixture of (Ti,Sb,Cr)O2 and (Ti,Fe,Zn)O2.

5. The article according to claim 1, wherein, in a cross sectional area of the film, a ratio of an area of the organic azo-based particle is 0.1% or more and 0.4% or less, and a ratio of the area of the particle containing Ti, O, and the inorganic metal other than Ti is 0.1% or more and 1.0% or less.

6. The article according to claim 1, wherein the organic azo-based particle is a particle of azomethine black.

7. The article according to claim 1, wherein the film has a brightness of 71 or more and 80 or less.

8. The article according to claim 1, wherein an average particle diameter of the particle containing Ti, O, and the inorganic metal other than Ti is 10 nm or more and 50 μm or less.

9. The article according to claim 1, wherein a content of the silica particles is 0.6% or more and 14% or less.

10. An optical apparatus comprising:
an optical element; and
a cover housing the optical element inside, the cover including
a film, and
a substrate
wherein the film contains a resin,
a titanium oxide particle whose surface is coated with silica, silica particles,
an organic azo-based particle, and
a particle containing Ti, O, and an inorganic metal other than Ti,
wherein the area of the organic azo-based particle is 100 area % on a cross section of the film and the content of the particle containing Ti, O, and the inorganic metal other than Ti is 25 area % or more and 1000 area % or less on a cross section of the film, and
an average particle size of the silica particles is 10 nm or more and 110 nm or less, and
wherein the film is formed on a surface on an outer side of the substrate.

11. The optical apparatus according to claim 10, having a brightness of 50 or more.

12. The optical apparatus according to claim 10, wherein the inorganic metal other than Ti is Sb, Cr, Fe, or Zn.

13. The optical apparatus according to claim 12, wherein the particle containing Ti, O, and the inorganic metal other than Ti is:
a particle of one material selected from the group consisting of (Ti,Sb,Cr)O2, and (Ti,Fe,Zn)O2, or
a particle of a mixture of materials selected from the group consisting of (Ti,Sb,Cr)O2, and (Ti,Fe,Zn)O2.

14. The optical apparatus according to claim 10, wherein, in a cross sectional area of the film, a ratio of an area of the organic azo-based particle is 0.1% or more and 0.4% or less, and a ratio of the area of the particle containing Ti, O, and the inorganic metal other than Ti is 0.1% or more and 1.0% or less.

15. The optical apparatus according to claim 10, wherein the organic azo-based particle is a particle of azomethine black.

16. The optical apparatus according to claim 10, wherein the film has a brightness of 71 or more and 80 or less.

17. The optical apparatus according to claim 10, wherein an average particle diameter of the particle containing Ti, O, and the inorganic metal other than Ti is 10 nm or more and 50 μm or less.

18. The optical apparatus according to claim 10, wherein a content of the silica particles is 0.6% or more and 14% or less.

19. A coating material comprising:
a resin;
a titanium oxide particle whose surface is coated with silica, silica particles;
an organic azo-based particle; and
a particle containing Ti, O, and an inorganic metal other than Ti,
wherein a content of the organic azo-based particle is 100 area % and a content of the particle containing Ti, O, and the inorganic metal other than Ti is 10 area % or more and 1600 area % or less, and
an average particle size of the silica particles is 10 nm or more and 110 nm or less.

20. The coating material according to claim 19, wherein the content of the organic azo-based particle is 0.1 wt % or more and 1.0 wt % or less relative to a nonvolatile component in the coating material, and
the content of the particle containing Ti, O, and the inorganic metal other than Ti is 0.1 wt % or more and 1.6 wt % or less relative to a nonvolatile component in the coating material.

21. The coating material according to claim 19, wherein the in inorganic metal other than Ti is Sb, Cr, Fe, or Zn.

22. The coating material according to claim 21, wherein the particle containing Ti, O, and the inorganic metal other than Ti is:
a particle of one material selected from the group consisting of (Ti,Sb,Cr)O2 and (Ti,Fe,Zn)O2, or
a particle of a mixture of (Ti,Sb,Cr)O2 and (Ti,Fe,Zn)O2.

23. The coating material according to claim 22, wherein the organic azo-based particle is a particle of azomethine black.

24. The coating material according to claim 19, wherein an average particle diameter of the particle containing Ti, O, and the inorganic metal other than Ti is 10 nm or more and 50 μm or less.

25. The coating material according to claim 19, wherein a ratio of an area of the silica particles is 0.6% or more and 14% or less relative to nonvolatile components in the coating material.

26. A method for producing an article, comprising:
applying a coating material onto a substrate, the coating material including particles containing a resin, a titanium oxide particle whose surface is coated with silica, silica particles, an organic azo-based particle, and a particle containing Ti, O, and an inorganic metal other than Ti; and
curing the coating material,
wherein a content of the organic azo-based particle is 100 area % and a content of the particle containing Ti, O, and the inorganic metal other than Ti is 10 area % or more and 1600 area % or less, and
an average particle size of the silica particles is 10 nm or more and 110 nm or less.

27. A method for producing the article according to claim 26,
wherein the particle containing Ti, O, and the inorganic metal other than Ti is:
a particle of one material selected from the group consisting of (Ti,Sb,Cr)O2 and (Ti,Fe,Zn)O2, or
a particle of a mixture of (Ti,Sb,Cr)O2 and (Ti,Fe,Zn)O2.

* * * * *